(12) United States Patent
Brown et al.

(10) Patent No.: US 11,232,478 B2
(45) Date of Patent: Jan. 25, 2022

(54) METHODS AND SYSTEM FOR COLLECTING STATISTICS AGAINST DISTRIBUTED PRIVATE DATA

(71) Applicant: MadHive, Inc., New York, NY (US)

(72) Inventors: Aaron Brown, New York, NY (US); Tom Bollich, New York, NY (US); Adam Helfgott, New York, NY (US); Rebecca Lerner, Los Angeles, CA (US); Nelson Hunter Prendergast, Reynoldsburg, OH (US); Nikolaos Melissaris Papanikolaou, Westfield, NJ (US)

( * ) Notice: Subject to any disclaimer, the term of this patent is extended or adjusted under 35 U.S.C. 154(b) by 340 days.

(21) Appl. No.: 16/562,787

(22) Filed: Sep. 6, 2019

(65) Prior Publication Data

US 2020/0082126 A1    Mar. 12, 2020

Related U.S. Application Data

(60) Provisional application No. 62/727,610, filed on Sep. 6, 2018.

(51) Int. Cl.
*G06F 21/62* (2013.01)
*G06Q 30/02* (2012.01)
(Continued)

(52) U.S. Cl.
CPC ......... *G06Q 30/0246* (2013.01); *G06F 16/27* (2019.01); *G06F 17/18* (2013.01); *G06F 21/6263* (2013.01); *G06Q 30/0251* (2013.01); *H04L 9/006* (2013.01); *H04L 9/008* (2013.01); *H04L 9/0637* (2013.01); *H04L 9/0643* (2013.01); *H04L 9/0822* (2013.01); *H04N 21/23424* (2013.01); *H04N 21/23473* (2013.01);
(Continued)

(58) Field of Classification Search
None
See application file for complete search history.

(56) References Cited

U.S. PATENT DOCUMENTS

| 2017/0243216 A1* | 8/2017 | Kohn | H04L 9/3236 |
| 2018/0025126 A1* | 1/2018 | Barnard | A61B 5/4833 |
| | | | 434/236 |
| 2018/0211718 A1* | 7/2018 | Heath | A01K 29/005 |

OTHER PUBLICATIONS

Hanke, T. et al., DFINITY Technology Overview Series Consensus System, Technology Overviews, Jan. 23, 2018.
Liu, J. et al., Linkable Spontaneous Anonymous Group Signature for Ad Hoc Groups, ACISP 2004, Lecture Notes in Computer Science, vol. 3108. Springer, Berlin, Heidelberg.

(Continued)

*Primary Examiner* — William J. Goodchild
(74) *Attorney, Agent, or Firm* — Derek Fahey; The Plus IP Firm

(57) ABSTRACT

A mechanism by which a secure, privacy preserving query system may be constructed from blockchain technology is disclosed. This system operates on the local differential privacy model through random responses using a private weighted coin protocol. The system specified allows for the ejection of malicious and/or non-interactive participants, minimizes blockchain storage size, and provides a mechanism for forward secrecy. The system specification uses a distributed random beacon to provide a public source of randomness. This randomness is utilized to perform random subset selection from a publicly known list of participating entities. The system uses a homomorphic self-tallying voting protocol under homomorphic encryption to further ensure participant privacy.

20 Claims, 5 Drawing Sheets

(51) Int. Cl.
    *G06F 17/18*     (2006.01)
    *H04L 9/06*     (2006.01)
    *H04L 9/00*     (2006.01)
    *H04L 9/08*     (2006.01)
    *H04N 21/234*     (2011.01)
    *H04N 21/2347*     (2011.01)
    *H04N 21/458*     (2011.01)
    *H04N 21/81*     (2011.01)
    *G06F 16/27*     (2019.01)
(52) U.S. Cl.
    CPC ......... *H04N 21/458* (2013.01); *H04N 21/812* (2013.01); *H04L 2209/38* (2013.01); *H04L 2209/463* (2013.01)

(56) References Cited

OTHER PUBLICATIONS

Hao, F. et al., Anonymous voting by two-round public discussion, IET Inf. Secur., 2010, pp. 62-67, vol. 4, Iss. 2, The Institution of Engineering and Technology.

Wood, D., Ethereum: A Secure Decentralised Generalised Transaction Ledger EIP-150 Revision, Ethereum project yellow paper, 2014, 1-32.

Warner, Stanley, Randomized Response: A Survey Technique for Eliminating Evasive Answer Bias, Journal of the American Statistical Association, 1965, pp. 63-69, 60:309, Taylor & Francis.

Chain Specification—Wiki Parity Tech Documentation, available as of Jul. 2019.

\* cited by examiner

METHODS AND SYSTEM FOR COLLECTING STATISTICS AGAINST DISTRIBUTED PRIVATE DATA

This application claims the benefit of priority of U.S. provisional application Ser. No. 62/727,610, filed on Sep. 6, 2018 the disclosure of which is herein incorporated by reference in its entirety.

FIELD

The method and systems disclosed in this document relates to data aggregation and, more particularly, to collecting statistics against distributed private data.

BACKGROUND

Unless otherwise indicated herein, the materials described in this section are not prior art to the claims in this application and are not admitted to the prior art by inclusion in this section.

Conventional techniques for collecting statistics on individuals or organizations often require a trusted third party for collecting, assessing, and aggregating the relevant information for calculating the statistics. Such techniques include electoral voting systems or public censuses, in which governmental organizations and their agents collect the private information received from citizens to determine statistics (e.g., a vote tally or demographic statistics) with respect to an aggregation of the private information, while also safeguarding the private information from being leaked in a manner that is individualized to a particular citizen. However, even with governmental organizations acting as a trusted third party, these system for collecting statistics are susceptible to abuse and manipulation by adversaries. In other fields, such as marketing and advertising, conventional techniques for collecting statistics on individuals or organizations are more problematic. Particularly, programmatic advertising techniques often involve substantial invasions of consumer privacy by third parties who, without the express consent or even knowledge of consumers, meticulously track the consumers' online behavior to infer a wide variety of demographic attributes about individual consumers and consumers in the aggregate. What is needed is a method of collecting statistics against distributed private information in a manner that maintains the privacy of the private information without the need for a trusted third party and is secure against abuse or manipulation by an adversarial third party.

SUMMARY

A method of participating with a first computing device in a calculation of a statistic with respect to distributed private data is disclosed. The first computing device is one of a distributed plurality of computing devices each having a memory that stores private data that is a respective subset of the distributed private data. The method comprises reading, with a processor of the first computing device, a query string that is stored on a first blockchain, the query string having been submitted to the first blockchain by a second computing device. The method comprises determining, with the processor, a query result by evaluating the query string with respect to the private data stored on the memory of the first computing device. The method comprises determining, with the processor, a vote based on the query result. The method comprises determining, with the processor, an encrypted vote using a homomorphic encryption scheme. The method comprises transmitting, with a transceiver of the first computing device, a first message to at least one second smart contract that is stored on a second blockchain, the first message including the encrypted vote.

A method of calculating a statistic with respect to distributed private data is disclosed. The distributed private data includes a plurality of subsets of private data stored on respective memories of a distributed plurality of first computing devices. The method comprises generating, with a processor of a second computing device, a query string. The method comprises transmitting, with a transceiver of the second computing device, a first message to at least one first smart contract that is stored on a first blockchain, the first message including the query string. The method comprises reading, with the processor, a plurality of encrypted votes that are stored on a second blockchain, each of the plurality of encrypted votes having been determined by a respective first computing device of the distributed plurality of first computing devices based on the respective subset of private data stored on the respective memory thereof using a homomorphic encryption scheme. The method comprises determining, with the processor, a final encrypted vote using the homomorphic encryption scheme. The method comprises determining, with the processor, a final vote tally based on the plurality of encrypted votes and the final encrypted vote. The method comprises transmitting, with the transceiver, a second message to at least one second smart contract that is stored on the second blockchain, the second message including the final encrypted vote and the final vote tally.

A method of operating at least one blockchain to enable a second computing device to calculate a statistic with respect to distributed private data is disclosed. The distributed private data includes a plurality of subsets of private data stored on respective memories of a distributed plurality of first computing devices. The method comprises executing, with at least one processor of at least one third computing device in a distributed network of third computing devices, instructions of at least one first smart contract stored on a first blockchain to (i) receive a query string from the second computing device and (ii) store the query string on the first blockchain. The method comprises executing, with the at least one processor, instructions of the at least one first smart contract stored on the first blockchain to generate a genesis block of a second blockchain, the genesis block storing at least one second smart contract. The method comprises executing, with the at least one processor, instructions of the at least one second smart contract stored on the second blockchain to (i) receive a plurality of encrypted votes from first computing devices of the distributed plurality of first computing devices and (ii) store the plurality of encrypted votes on the second blockchain, each of the plurality of encrypted votes having been determined by a respective first computing device of the distributed plurality of first computing devices based on the respective subset of private data stored on the respective memory thereof. The method comprises executing, with the at least one processor, instructions of the at least one second smart contract stored on the second blockchain to receive a final encrypted vote and a final vote tally from the second computing device, the final vote tally being determined by the second computing device based on the plurality of encrypted votes and the final encrypted vote.

BRIEF DESCRIPTION OF THE DRAWINGS

The foregoing aspects and other features of the methods and system are explained in the following description, taken in connection with the accompanying drawings.

DETAILED DESCRIPTION

Figure 1:
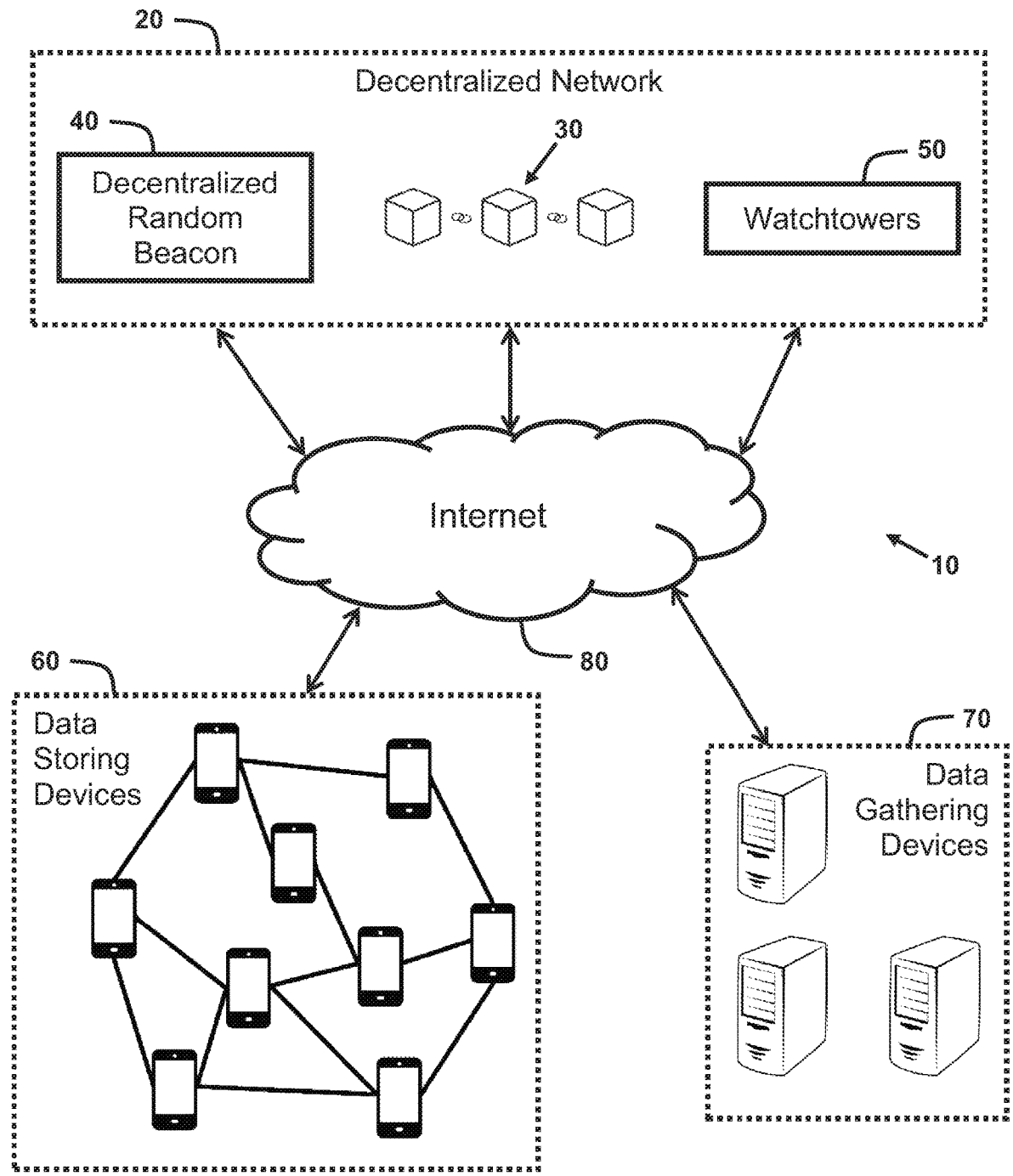
FIG. 1 shows an exemplary embodiment of a system for aggregating distributed private data.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

The data aggregation techniques disclosed herein advantageously enable statistics to be collected with respect to an aggregation of private data stored on a plurality of private devices. In particular, a data gather is enabled to poll a plurality of private data storing devices using a model which seeks an answer, such as true or false, from each private data storing devices with respect to the private data stored thereat. A homomorphic self-tallying protocol is advantageously used to provide a tally of the polling answers in such a manner that the individual answers cannot be tied to individual private data storing devices, thus maintaining the privacy of the private data stored by each data storing devices.

System Overview

Figure 2:
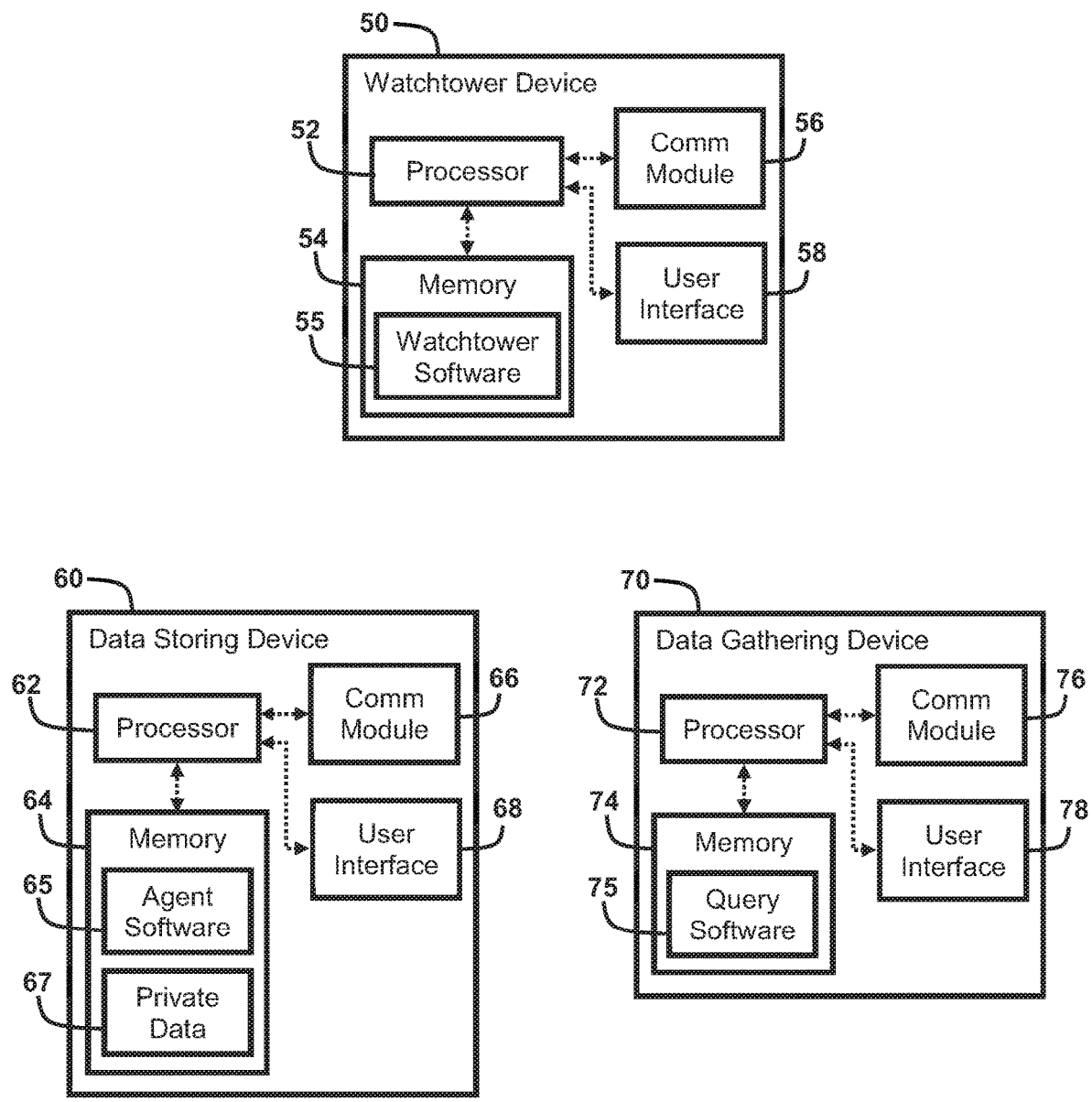
FIG. 2 shows exemplary hardware embodiments of a watchtower, a data storing device and a data gathering device of the system of FIG. 1.

With reference to FIGS. 1-2, exemplary embodiments of a system 10 for collecting statistics with respect to an aggregation of distributed private data are described. With reference to FIG. 1, the system 10 comprises a plurality of computing devices that are associated with different parties or components of the system 10. Particularly, in the illustrated embodiment, the system 10 includes a distributed network 20 having at least one public blockchain 30, a decentralized random beacon 40, and a plurality of watchtowers 50. In addition, the system 10 comprises a plurality of data storing devices 60 and at least one data gathering device 70, which communicate and interact with the distributed network 20 via network infrastructure, such as the Internet 80.

As will be described in greater detail below, the system 10 enables the data gathering device 70 to collect statistics with respect to an aggregation of private data held by the plurality of data storing devices 60 in a manner than advantageously maintains the privacy of the private data held by the plurality of data storing devices 60. Particularly, each data storing device 60 holds private data that may, for example, comprise private information of an individual who owns the respective data storing device 60 or private information of a plurality of individuals for whom the owner of the respective data storing device 60 acts as a trustee of the private information. In one particular example, the private information may comprise demographic information of the type typically used to target online advertisements. Each data storing device 60 includes agent software that runs with privileged access in the background of the data storing device 60 and functions as an intelligent, cryptographically-secured repository of the private data. The agent software manages the private data in the secure repository and, when actions need to be performed on that data, agent software performs the actions inside the secure repository and produces an answer or other output. In this way, work can be done with respect to the private data, but privacy of the private data remains intact.

The at least one data gathering device 70 is a device owned or in the possession of an entity, such as an individual or an organization, that wishes to collect statistics with respect to an aggregation of private data held by the plurality of data storing devices 60. Using blockchain technology, the system 10 advantageously enables a data gathering device 70 to collect such statistics while maintaining the privacy of the private data held by the plurality of data storing devices 60. Particularly, as described in greater detail below, this is achieved using a homomorphic self-tallying process for testing a model that has been provided by a one data gathering device 70 and producing a statistical output.

In one particular example, the entity associated with the data gathering device 70 may be an advertiser that wishes to purchase targeted advertisement impressions of a particular advertisement by consumers who fit within a target audience and are associated with the plurality of data storing devices 60. In order to provide targeting of the advertisement, the advertiser specifies targeting criteria, in the form of a targeting model, which defines the target audience for a particular advertisement. The system 10 advantageously enables the advertiser to test the targeting model with respect to the consumers associated with the plurality of data storing devices 60 to determine whether the targeting model has an appropriate scope (i.e., is not overly broad or overly narrow).

The distributed network 20 is a decentralized peer-to-peer network of computing devices, referred to herein as nodes, which are configured to communicate with one another via a network infrastructure, such as the Internet 80. The nodes may comprise any network-connected computing device and generally comprise at least a processor, a memory, and a network communications module. The nodes operate to fulfill various roles required to maintain and operate at least one public blockchain 30, such as storing a copy of some or all of the at least one public blockchain 30, processing transactions, generating blocks to record the transactions, adding the blocks to at least one public blockchain 30, approving or verifying blocks to be added to at least one public blockchain 30, and broadcasting new blocks to the nodes of the distributed network 20.

It will be appreciated by those of ordinary skill in the art that a blockchain is a distributed ledger. Blockchains have the advantageous property that, once data has been added to a blockchain, the data is immutable and cannot be modified. A blockchain is comprised of an ordered sequence of "blocks." Each block contains some data, a hash of the block, and a hash of the previous block. The data stored in the block is application dependent and may include, for example, information regarding one or more transactions on the blockchain, program instructions for a smart contract, and information regarding a state of the blockchain or the distributed network that maintains the blockchain. The hash of the block acts as a digital fingerprint and uniquely identifies the block and its content. The hash of the previous block acts as a link or chain to the previous block in the ordered sequence. These hashes enable the immutable quality of the blockchain. Particularly, if the data of particular block is tampered with, the hash of the block changes, with the result that any subsequent blocks become invalid. In addition to hashing, a blockchain utilizes a decentralized consensus mechanism, such as a proof of work or proof of stake protocol, which provides a process and set of rules for determining, in a distributed and decentralized manner, whether or not a new block should be added to the blockchain. The consensus mechanism further makes tampering with the data of the blockchain highly impractical, if not impossible.

The at least one public blockchain 30 is configured to support smart contracts and may, for example, be an Ethereum-based blockchain. As used herein "smart contracts" are executable computer programs stored on the blockchain and are executed autonomously by nodes of a distributed network in a decentralized manner. Smart contracts are written using a suitable programming language, such as Solidity. As a corollary, the blockchain 30 is also configured to support at least two types of accounts, externally owned accounts and contract accounts. It will be appreciated, however, that in some embodiments there needn't be a technical distinction between the two types of accounts. Externally owned accounts are associated with individual users or organizations and are controlled with a corresponding private key in the possession of the associated user or organization. Each externally owned accounts can generally send or receive digital currency (e.g., Ether) and generally has a digital currency balance. Additionally, externally owned accounts can send or initiate transactions. A transaction may comprise the transferring digital currency to another account, initiating execution of a smart contract, or a combination thereof.

In contrast, contract accounts operate autonomously and are controlled by code and, in particular, a smart contract. Much like an externally owned account, a contract account can generally send or receive digital currency and may have a digital currency balance. However, a contract account executes instructions of a smart contract in response to receiving a triggering transaction or message from an externally owned account or another contract account. A smart contract may, for example, distribute received digital currency to other accounts based on a set of rules. In practice, the instructions of a smart contract are executed by a virtual machine comprised of the distributed and decentralized nodes of the distributed network 20. Since smart contracts are stored in the at least one public blockchain 30, they inherit the advantages of the blockchain and, in particular, are distributed and cannot be modified. In this way, no individual party is in control of the digital currency in a contract account, no one can tamper with the instructions of the smart contract, and the outputs of the smart contract are validated by the nodes of the distributed network 20.

The distributed network 20 is configured to provide a decentralized random beacon 40 (which may also be referred to as a decentralized random clock). The decentralized random beacon 40 is a cryptographically secure source for an unbiasable, publicly verifiable random function (VRF) that broadcasts a verifiable random value $\xi$ at regular intervals. Each verifiable random value $\xi$ broadcasted by the decentralized random beacon 40 is unpredictable given knowledge of all prior random values, but is also easily verifiably correct. The verifiable random values $\xi$ are generated jointly in a decentralized manner by a group of nodes $G_{RB}$ of the distributed network 20. Particularly, the group of nodes $G_{RB}$ that participate in providing the decentralized random beacon 40 utilize a decentralized random beacon protocol which enables the group of nodes $G_{RB}$ to agree upon and jointly produce a deterministic, pseudo-random sequence of verifiable random values $\xi$. Additionally, the decentralized random beacon protocol is Byzantine Fault Tolerant with respect to the group of nodes $G_{RB}$ that coordinate to generate each verifiable random value $\xi$.

In some embodiments, the decentralized random beacon 40 is generated using a scheme in which the group of nodes $G_{RB}$ is rewarded for generating the verifiable random values $\xi$. The nodes must place a stake, which may be held in the form of a digital currency or token and which may be revoked for non-participation or malicious participation. The reward for generating the verifiable random values $\xi$ is greater than the rate of inflation of the currency for the required stake held in escrow or, in other words, the reward exceeds the time value of the stake.

In some embodiments, the decentralized random beacon protocol utilized by the decentralized random beacon 40 employs a t-of-n threshold BLS signature scheme to for randomness generation, where n is the number of nodes in the group of nodes $G_{RB}$ that participate in providing the decentralized random beacon 40. In a set up phase, a Shamir's Secret Sharing Scheme is used for distributed key generation. Particularly, the group of nodes $G_{RB}$ generate a group public key and secret key shares for each node in the group of nodes $G_{RB}$. It should be appreciated that the group secret key is not explicitly known to any individual node in the group of nodes $G_{RB}$, but can be implicitly used with any threshold number t of signature shares that are generated using the respective secret key shares. The threshold number t is a Byzantine Fault Tolerant subset t=[2n/3]+1 of the signature shares.

To generate each verifiable random value $\xi$, the group of nodes $G_{RB}$ each generate and broadcast a signature share based on the previous verifiable random value $\xi$ using their respective secret key share with a pairing friendly elliptic curve. In the case of generating a first verifiable random value $\xi$, the group of nodes $G_{RB}$ generate their signature shares with a random seed value, which may comprise a nothing-up-my-sleeve-value such as the hash of a random word. It will be appreciated that these signature shares do not leak the associated secret key share of the participating nodes. When any node in the group of nodes $G_{RB}$ receives a threshold number t of signature shares, a group signature can be recovered, and a new verifiable random value $\xi$ is calculated as the hash of the group signature.

The distributed network 20 includes a subset of nodes that are referred to herein as the watchtowers 50. Each watchtower 50 is associated with a producer of one or more particular variants of the agent software that runs on the data storing devices 60. As discussed in greater detail below, the watchtowers 50 are responsible for maintaining or operating one or more blockchains on the distributed network 20 that are used to implement a method of collecting statistics with respect to an aggregation of the private data held by the plurality of data storing devices 60 in a manner that advantageously maintains the privacy of the private data held by the plurality of data storing devices 60.

FIG. 2 shows exemplary hardware embodiments of a watchtower 50, a data storing device 60 and a data gathering device 70. Particularly, the watchtower 50, the data storing devices 60, and the data gathering devices 70 generally take the form of computing devices, each having at least a processor 52, 62, or 72, a memory 54, 64, or 74, and a communication module 56, 66, or 76, respectively. The memories 54, 64, and 74 are configured to store data and program instructions that, when executed by the respective processor 52, 62, or 72, enable the respective computing device to perform various operations described herein. The memories 54, 64, and 74 may be of any type of device capable of storing information accessible by the processor, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processors 52, 62, and 72 may include a central processing unit, graphics processing units, multiple processing units, dedicated circuitry for achieving functionality, programmable logic, or other processing systems.

The communication modules 56, 66, and 76 generally comprise one or more transceivers, modems, or other communication devices configured to enable communications with various other devices via a network infrastructure, in particular via the Internet 80, using a suitable communication standard. The communication modules 56, 66, and 76 may further comprise hardware such as antennas, processors, memories, oscillators, or other hardware conventionally included with transceivers, modems, or other communication devices.

The data storing devices 60, although illustrated as smart phones in FIG. 1, may comprise wide variety of different network-enabled computing devices that store private data. Exemplary data storing devices 60 may include smart phones, laptop computers, tablet computers, desktop computers, smart televisions, home audio receivers, and in-car infotainment systems or audio receivers. The watchtowers 50 and the data gathering devices 70 may likewise comprise a wide variety of different network-enabled computing devices, but generally comprise servers or the like. In some embodiments, the watchtowers 50, the data storing devices 60, and/or the data gathering devices 70 further include one or more user interfaces 58, 68, and 78. The user interfaces 68 may comprise a display screen, including touch-sensitive displays, a mouse or other pointing device, a keyboard or other keypad, speakers, a microphone, and other user interfaces that will be recognized by those of ordinary skill in the art.

The memories 64 of the data storing devices 60 store agent software 65 that, as described above, runs with privileged access in the background of the data storing device 60 and functions as an intelligent, cryptographically-secured repository of the private data. Additionally, the memory 64 of the data storing devices 60 further stores private data 67. As described above, the private data 67 may, for example, comprise private information of an individual who owns the respective data storing device 60 or private information of a plurality of individuals for whom the owner of the respective data storing device 60 acts as a trustee of the private information.

The agent software 65 enables the data storing devices 60 to interact with the at least one public blockchain 30, and smart contracts thereof, to participate in the collection of statistics with respect to an aggregation of the private data 67 held by the plurality of data storing devices 60. It should be appreciated that there may be a number of different variants of the agent software 65 developed by different producers associated with different watchtowers 50. However, each variant of the agent software 65 may be developed using a common software development kit (SDK) implementing a common application programming interface (API) for interacting with the at least one public blockchain 30 of the distributed network 20.

The memory 54 of the watchtowers 50 stores watchtower software 55 that enables the watchtower to maintain and operate the at least one public blockchain 30 of the distributed network 20. In particular, the watchtower software 55 may enable the watchtower 50 to prepare and submit a block of transactions to the at least one public blockchain 30, verify or validate blocks submitted to the at least one public blockchain 30 by other watchtowers, execute smart contracts of the at least one public blockchain 30, and perform other known functions for maintaining and operating the at least one public blockchain 30. It should be appreciated that there may be a number of different variants of the watchtower software 55. However, each variant of the watchtower software 55 may be developed using a SDK implementing a common API for maintaining and operating the at least one public blockchain 30 of the distributed network 20.

The memory 74 of the data gathering devices 70 stores query software 75 that enables the data gathering devices 70 to interact with the at least one public blockchain 30 to query and collect statistics with respect to an aggregation of private data held by the plurality of data storing devices 60. It should be appreciated that there may be a number of different variants of the query software 75. However, each variant of the query software 75 may be developed using a SDK implementing a common API for interacting with the at least one public blockchain 30 of the distributed network 20.

Methods for Collecting Statistics Against Distributed Private Data

Methods and software for operating the system 10 are described below. Particularly, various methods, processes, and/or operations are described for implementing and interacting with at least one blockchain on a distributed network for the purpose of collecting statistics with respect to an aggregation of distributed private data. In the description of the methods, processes, and/or operations, statements that a particular device, method, and/or processer is performing some task or function generally refers to a processor (e.g., the processor 52, 62, or 72) of a computing device in the system 10 executing corresponding programmed instructions (e.g., the watchtower software 55, the agent software 65, or the query software 75) stored in non-transitory computer readable storage media (e.g., the memory 54, 64, or 74) operatively connected to the processor to manipulate data or to operate one or more components of the computing device or of the system 10 to perform the task or function. Additionally, and in particular, statements that a smart contract of a blockchain performs some task or function generally refers to a processor of a node of a distributed network (e.g., the processor 52 of a watchtower 50 or other node of the distributed network 20) executing corresponding programmed instructions of the smart contract, which are stored on the blockchain, to manipulate data of the blockchain to perform the task or function. Moreover, the steps or operations of the methods and/or processes may be performed in any feasible chronological order, regardless of the order shown in the figures or the order in which the steps or operations are described.

Figure 3:
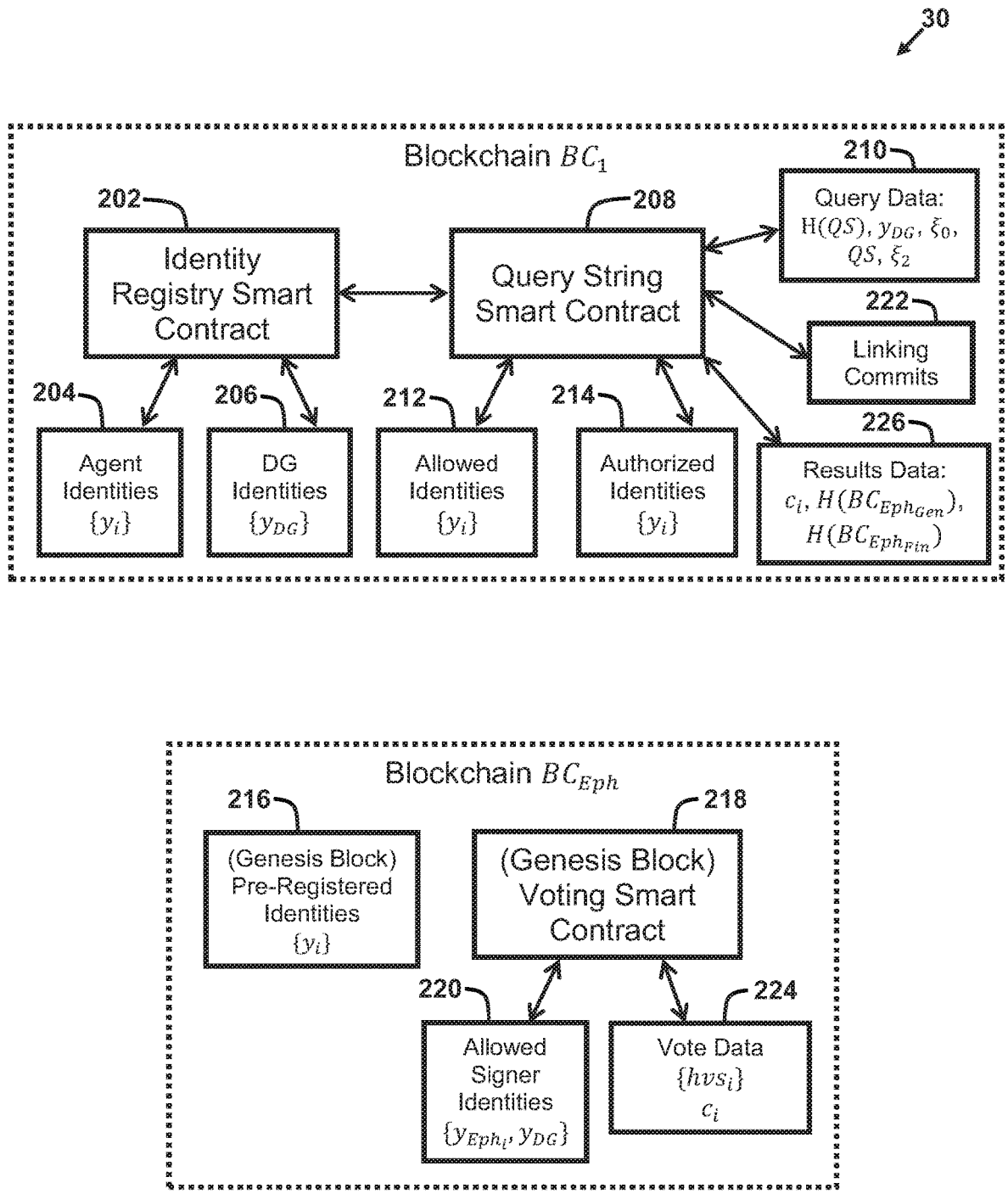
FIG. 3 shows exemplary blockchains storing exemplary smart contracts and data used for collecting statistics with respect to an aggregation of distributed private data.

With reference to FIG. 3, the at least one public blockchain 30 includes a blockchain $BC_1$, which is configured to support smart contracts and is maintained and operated by the watchtowers 50. The executable program instructions of each smart contract are stored on the blockchain and are executed in a distributed manner by the watchtowers 50 when the smart contracts are transacted with by an authorized device of the system 10. The smart contracts of blockchain $BC_1$ advantageously have access to the pseudo-random sequence verifiable random values ξ. Additionally, the blockchain $BC_1$ is configured to allow interactions with the blockchain on a service transaction model. In this context, a service transaction is a transaction that allows the distributed network 20, in particular the watchtowers 50, to cover the cost of performing computation and/or modification of state in the blockchain $BC_1$.

In some embodiments, the blockchain $BC_1$ is a permissioned blockchain that utilizes a consensus mechanism other than a proof of work based consensus mechanism. Particularly, in at least one embodiment, the consensus mechanism of the blockchain $BC_1$ operates with a leader election process with respect to an allowed set of validators, i.e., some or all of the watchtowers 50. The leader election process utilizes the pseudo-random sequence verifiable random values ξ provided by the decentralized random beacon 40 to randomly determine which of the watchtowers 50 are responsible for the preparation and submission of each block of transactions to the blockchain $BC_1$.

The leader election process can be implemented using a variety of different methods. For example, in one embodiment, let the values $s=\{s_1, s_2, \ldots, s_n\}$ correspond to identifiers for the watchtowers 50, where the values of s can be interpreted as an integer. Additionally, let each verifiable random value ξ provided by the decentralized random beacon 40 also be interpreted as an integer. For each cycle, a random leader from the watchtowers 50 is be selected by choosing the watchtower 50 has an identifier s that is closest to, but not greater than, the verifiable random value ξ last emitted by the decentralized random beacon 40. Additionally, in the case that an adversary might be empowered to choose an identity at random, the randomness of the beacon 40 can be folded into the identifiers s of the watchtowers 50 in order to prevent censorship attacks against a given set member. These attacks are possible, under a non-randomized identifier space, because a malicious party may randomly select an identifier such that it closely bounds a key that the malicious party wishes to censor. In order to prevent this attack, a random leader from the watchtowers 50 can instead be selected by choosing the watchtower 50 that has a hash $H(s_i \| r)$ that is closest to, but not greater than, the verifiable random value ξ last emitted by the decentralized random beacon 40, where the hash $H(s_i \| r)$ is of its respective identifier $s_i$ concatenated with a random value r. In this way, the distribution of identifiers, in the integer space defined by the security parameter of the hash function H( ), is well distributed and randomized for each new verifiable random value ξ of the decentralized random beacon 40.

With continued reference to FIG. 3, the blockchain $BC_1$ includes at least one identity registry smart contract 202 that records the particular agent software entities that are allowed to perform service transactions on the blockchain $BC_1$. In particular, the identity registry smart contract 202 includes logic for adding and removing entities from a list of agent software entities 204 that are allowed to perform service transactions on the blockchain $BC_1$. The identity registry smart contract 202 includes a requirement that a fee or stake, for example in the form of a digital currency, must be deposited into the identity registry smart contract 202 in order for a respective entity to be added to the list of agent software entities 204 that are allowed to perform service transactions on the blockchain $BC_1$.

The agent software 65 of each data storing device 60 has a unique cryptographic identity. For example, in the embodiments described herein, the unique cryptographic identity for data storing device 60, having the index i, comprises is a public-private key pair $(y_i, x_i)$, such that $y_i = g^{x_i}$, in an asymmetric cryptographic system in which the private key $x_i$ is capable of generating secure digital signatures that are verifiable with the public key $y_i = g^{x_i}$ to prove possession of a the private key $x_i$ by the signer. Thus, the list of agent software entities 204 consists of a set of public keys $y_i = g^{x_i}$ for the registered instances of agent software 65 and/or data storing devices 60. The unique cryptographic identity may be generated prior to downloading the agent software 65 to the data storing device 60. Alternatively, the unique cryptographic identity may be generated and loaded during the time of manufacture of the data storing device 60. The respective public keys for instances of agent software 65 that are registered with the blockchain $BC_1$ are stored in the list of agent software entities 204.

In at least one embodiment, in order to claim a cryptographic identity, in the blockchain $BC_1$, the processor 62 of a data storing device 60 first claims an identity that is known to the corresponding watchtower 50 that is associated with the producer of the particular variant of the agent software 65. Particularly, the processor 62 signs a new cryptographic public key, under a private key provided by the corresponding watchtower 50 and transmits a claiming message having the public key to the corresponding watchtower 50. This new cryptographic public key is an asymmetric key such that only the agent software 65 has knowledge of the private key. On receipt of a valid claiming message including a known cryptographic identity, the processor 52 of the corresponding watchtower 50 generates a digital signature of the provided public key in the claiming message and transmits it to the agent software 65 of the data storing device 60. This digital signature is preferably verifiable with a public key that is associated with the corresponding watchtower 50 in some Public Key Infrastructure (PKI), which is accessible to the blockchain $BC_1$. The returned digital signature of the corresponding watchtower 50 acts as a proof of authentication for the agent software 65, with respect to being the particular variant of the agent software 65 created by the signing watchtower 50.

The unique cryptographic identities $y_i = g^{x_i}$ claimed by each instance of agent software 65 running on the data storing devices 60 are used to register each instance of agent software 65 with the list of agent software entities 204 that are allowed to perform service transactions on the blockchain $BC_1$, which is managed by the identity registry smart contract 202. Particularly, in order to register with the list of agent software entities 204, the processor 62 of a data storing device 60 initiates a transaction with the registry smart contract 202 and provides the digital signature of the corresponding watchtower 50 as a proof of authentication. The identity registry smart contract 202 is executed to validate the digital signature of the corresponding watchtower 50 and any additional information necessary to prevent fraudulent registrations. After such validation, identity registry smart contract 202 is executed to add the instance of agent software 65 on the particular data storing device 60 to the list of agent software entities 204 that are allowed to perform service transactions on the blockchain $BC_1$ by storing the signed public key as a unique cryptographic identity that is approved for service transactions in blockchain $BC_1$.

In some embodiments, the watchtowers 50 are responsible for paying the required fee or stake for registering the cryptographic identities $y_i$ of the instances of the agent software 65 that they produced with the list of agent software entities 204. Thus, the watchtowers 50 are responsible for the operations and behavior of the instances of the agent software 65 that they produced and registered with the blockchain $BC_1$. In some embodiments, the watchtowers 50 each store in the memory 54 an isolated registry of those cryptographic identities $y_i$ that it has funded. Alternatively, or in addition, the list of agent software entities 204 identifies which watchtower 50 has funded the registration each particular cryptographic identity in the list of agent software entities 204.

Finally, the data gathering device(s) 70 also have unique cryptographic identities $y_{DG}$, which are registered with the blockchain $BC_1$. The cryptographic identities of the data gathering device(s) 70 may be registered the blockchain $BC_1$ using the identity registry smart contract 202 or another smart contract. Particularly, in one embodiment, the identity registry smart contract 202 or another smart contract is configured to record the particular data gather entities that are allowed to submit queries, with respect to the private data 67 stored by the plurality of data storing devices 60, in a list of data gathering identities 206. In order to register with the list of data gathering identities 206, the processor 72 of a data gathering device 70 initiates a transaction with the identity registry smart contract 202 or other smart contract. After some kind of validation and/or fee payment, the identity registry smart contract 202 or other smart contract is executed to add the data gathering device 70 to the list of data gathering identities 206 that are allowed to perform submit queries by storing a public key $y_{DG}=g^{x_{DG}}$ or the like as a unique cryptographic identity that is approved to submit queries.

Figure 4:
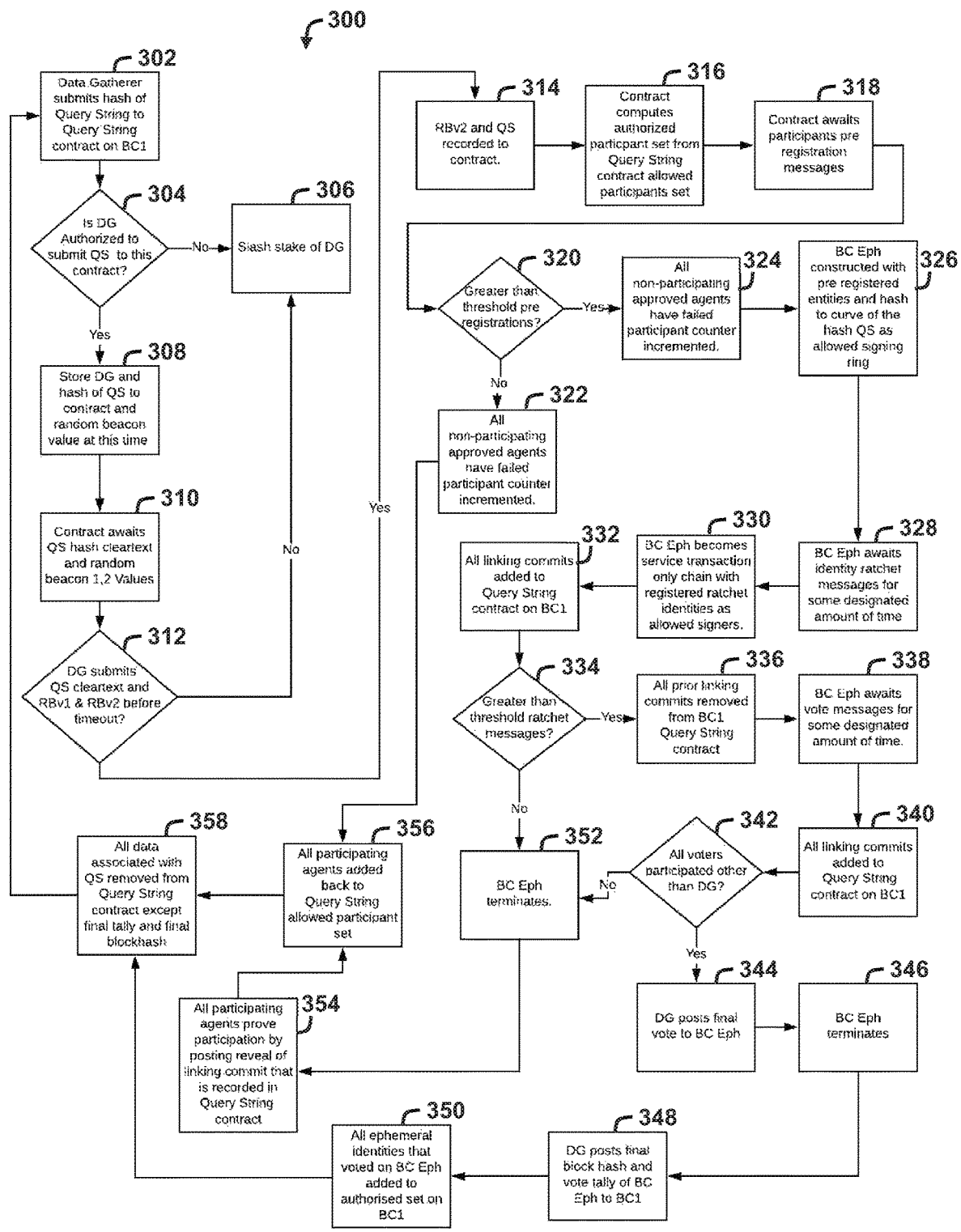
FIG. 4 shows a method for collecting statistics with respect to an aggregation of distributed private data.

FIG. 4 shows a method 300 for collecting statistics with respect to an aggregation of distributed private data. The method enables a data gathering device to poll and/or query a plurality of data storing devices using a model and/or query string that seeks an answer, such as true or false, from each data storing devices with respect to the private data stored thereat. A homomorphic self-tallying protocol is advantageously used to provide a tally of the polling answers in a manner such that the individual answers cannot be tied to individual data storing devices, thus maintaining the privacy of the private data stored by each data storing device.

The method 300 begins with a step of submitting, with a data gathering device, a hash of a query string to a query string smart contract on the blockchain $BC_1$ (block 302). Particularly, the processor 72 of the data gathering device 70 generates a query string QS. In some instances, the processor 72 generates the query string QS based on inputs from a user of the data gathering device 70, which are received via the user interface 78. In other cases, the processor 72 generates the query string QS autonomously using some other process. As used herein, a "query string" refers to a string, vector of strings, or the like representing a query that can be evaluated against one or more data points to provide a result, answer, or output. In one particular example, the query string may define a targeting model that define a target audience for an advertisement.

In some embodiments, the query string QS may comprise one or more Boolean test statements. Each Boolean test statement seeks an answer or output with respect to attributes of the individuals about which the private data 67 pertains. The Boolean test statements include combinational logic for processing one or more data points to arrive at a true or false answer. For example, in an advertising context a Boolean test statement might define a target audience for an advertisement. For example a target audience for an avocado-toast with eggs advertisement, might be defined by the Boolean test statement: "Consumer is an Avocado-Toast intender and lives in Brooklyn and is vegetarian but is not vegan." An answer of "true" to this statement can indicate the consumer falls within the target audience. An answer of "false" indicates the consumer may not fall within the target audience. For example, while the consumer may be a Brooklynite avocado-toast intender, who frequents vegetarian recipe sites, she may be vegan and therefore may not buy the advertiser's avocado-toast with eggs.

In some embodiments, the query string QS may comprise a set of program instructions with trained weight/kernel values corresponding a machine learning model that is configured to, based on input data points, output a true or false value or a confidence metric, such as a value between 0.0 and 1.0. It will be appreciated that machine learning is process that uses statistical inference, randomness, and brute force computation to ascertain a ruleset based on data alone. For example, in an advertising context an exemplary machine learning model might be configured to determine whether a consumer is within a target audience for an avocado-toast with eggs advertisement by analyzing thousands of purchase receipts and demographic data associated with the consumer.

After generating the query string QS, the processor 72 calculates a query string hash H(QS) based on the query string QS using a hashing algorithm. The processor 72 operates the communication module 76 to transmit a query string hash message, which includes the query string hash H(QS), to a query string smart contract 208 of the blockchain $BC_1$. In at least one embodiment, the query string hash message includes a message signature under the cryptographic identity $y_{DG}$ of the data gathering device 70, generated by the processor 72 with the corresponding private key $x_{DG}$. Particularly, returning to FIG. 3, the blockchain $BC_1$ includes a query string smart contract 208 that is stored on the blockchain $BC_1$ and can be executed by the distributed network 20, in particular one or more of the watchtowers 50, to assist in the collection of statistics with respect to an aggregation of distributed private data 67, based on a query string received from a data gathering device 70.

Returning to FIG. 4, the method 300 continues with a step of executing the query string smart contract to determine whether the data gathering device is authorized to submit query strings to the query string smart contract (block 304). Particularly, the processor 52 of one or more of the watchtowers 50 reads program instructions of the query string smart contract 208 from the blockchain $BC_1$ and executes the instructions of the query string smart contract 208 to determine whether the data gathering device 70 that submitted the query string hash H(QS) is authorized to submit query strings to the query string smart contract 208. In at least one embodiment, the processor 52 reads the list of data gathering identities 206 from the blockchain $BC_1$ and checks whether a cryptographic identity $y_{DG}=g^{x_{DG}}$ (i.e., a public key) of the data gathering device 70 that submitted the query string hash H(QS) is in the list of data gathering identities 206. If the cryptographic identity $y_{DG}$ is not in the list of data gathering identities 206, then the processor 52 determines that the data gathering device 70 that submitted the query string hash H(QS) is not authorized. Otherwise, if the cryptographic identity $y_{DG}$ is in the list of data gathering identities 206, then processor 52 determines that the data gathering device 70 that submitted the query string hash H(QS) is authorized. In some embodiments, the query string smart contract 208 is configured to apply one or more additional rules for determining whether the data gathering device 70 that submitted the query string hash H(QS) is authorized, beyond merely requiring the data gathering device 70 be registered with the list of data gathering identities 206, such as rules regarding how often a data gathering device 70 can submit queries or rules against repetitive submission of identical queries.

If the data gathering device is not authorized, then the method 300 continues with a step of executing the query string smart contract to slash a stake of the data gathering device (block 306). Particularly, in response to determining that the data gathering device 70 that submitted the query string hash H(QS) is not authorized, the processor 52 of one or more of the watchtowers 50 executes instructions of the query string smart contract 208 to deduct a predetermined amount or percentage from a stake or fee deposit associated with the unauthorized data gathering device 70. In some embodiments, this may comprise transacting with another smart contract, such as the identity registry smart contract 202, or broadcasting a transaction to all of the watchtowers 50 that maintain and operate the blockchain $BC_1$, to deduct the predetermined amount or percentage from the stake of the unauthorized data gathering device 70.

Otherwise, if the data gathering device is authorized, then the method 300 continues with a step of executing the query string smart contract to store, on the blockchain $BC_1$, query data including the identity of the data gathering device, the hash of the query string, and a most recent verifiable random value from the decentralized random beacon at the time (block 308). Particularly, in response to determining that the data gathering device 70 that submitted the query string hash H(QS) is authorized, the processor 52 of one or more of the watchtowers 50 executes instructions of the query string smart contract 208 to operate the communication module 56 to store query data 210 on the blockchain $BC_1$, as shown in FIG. 3. The query data 210 stored at this time includes the query string hash H(QS), the cryptographic identity $y_{DG}$ of the data gathering device 70 that submitted the query string hash H(QS), and a most recent verifiable random value $\xi_0$ broadcasted by the decentralized random beacon 40 at the time.

After storing the query data, the method 300 continues with steps of waiting (block 310) until the data gathering device submits the query string in clear text, with a required number of subsequent verifiable random values from the decentralized random beacon (block 312). Particularly, the processor 72 of the data gathering device 70 waits for and receive, via the communication module 66, a required number (e.g., two) of subsequent verifiable random values $\xi$ that are broadcast by the decentralized random beacon 40 subsequent to the verifiable random value $\xi_0$. Once the required number of subsequent verifiable random values $\xi$ have been received, the processor 72 operates the communication module 76 to transmit a query string reveal message to the query string smart contract 208, which includes the query string QS in clear text and the required number of subsequent verifiable random values $\xi$ (e.g., first and second subsequent verifiable random values $\xi_1$ and $\xi_2$). In at least one embodiment, the query string reveal message includes a message signature under the cryptographic identity $y_{DG}$ of the data gathering device 70, generated by the processor 72 with the corresponding private key $x_{DG}$.

The method 300 continues with a step of executing the query string smart contract to store, on the blockchain $BC_1$, the query string and a latest of the subsequent verifiable random value (block 314). Particularly, the processor 52 of one or more of the watchtowers 50 executes instructions of the query string smart contract 208 to receive the query string reveal message from the data gathering device 70. The processor 52 operates the communication module 56 to store the query string QS and the latest of the subsequent verifiable random values $\xi$ (e.g., the second subsequent verifiable random value $\xi_2$) in the query data 210 on the blockchain $BC_1$. In some embodiments, the processor 52 operates the communication module 56 to store all of the required number of subsequent verifiable random values $\xi$ (e.g., both of the first and second subsequent verifiable random values $\xi_1$ and $\xi_2$). In some embodiments, processor 52 is configured to independently calculate the query string hash H(QS) based on the received query string QS in clear text using the hashing algorithm and verify that the calculated query string hash H(QS) is the same as the query string hash H(QS) that was received from the data gathering device 70 with the query string hash message (at block 302). If the calculated query string hash H(QS) is different from the query string hash H(QS) that was received from the data gathering device 70 with the query string hash message, the method 300 halts.

It should be appreciated that the submission of the initial verifiable random value $\xi_0$ and the predefined number of subsequent verifiable random values $\xi$ (e.g., the first and second subsequent verifiable random value $\xi_1$ and $\xi_2$) enables it to be proven that a particular amount of time has passed between the query string hash message and the query string reveal message. This passage of time that ensures the latest verifiable random value $\xi_2$ emitted by the decentralized random beacon 40 could not have been predicted by the data gathering device 70 at the time of generating the query string QS and submitting query string hash H(QS). This is important because latest verifiable random value $\xi_2$ is utilized as a randomized sub-selection criterion (RSSC) for the method 300.

With continued reference to FIG. 4, the method 300 continues with a step of executing the query string smart contract to calculate an authorized participant subset of data storing devices from an allowed participant set of data storing devices (block 316). Particularly, the processor 52 of one or more of the watchtowers 50 executes instructions of the query string smart contract 208 to calculate a list of authorized participant identities 214 as a subset of a list of allowed participant identities 212. The list of allowed participant identities 212 is stored on the blockchain $BC_1$ and comprises an unsorted linked list of cryptographic identities $y_i$ (i.e., a subset of public keys $y_i = g^{x_i}$) associated with individual instances of agent software 65 and/or data storing devices 60 that are allowed to participate in a querying process for the received query string QS. In some embodiments, list of allowed participant identities 212 includes all of the identities registered with the list of agent software entities 204. In other embodiments, list of allowed participant identities 212 includes only a subset of the identities registered with the list of agent software entities 204, such as a subset that were funded by a particular watchtower 50. The list of authorized participant identities 214 is also an unsorted linked list of cryptographic identities $y_i$ (i.e., a subset of public keys $y_i = g^{x_i}$) and comprises a random subset of those cryptographic identities $y_i$ in the list of allowed participant identities 212.

The processor 52 calculates the random subset of cryptographic identities $y_i$ to be included in the list of authorized participant identities 214 based on the latest verifiable random value $\xi_2$ (i.e., the RSSC). In one embodiment, the processor 52 calculates a hash of the latest verifiable random value $\xi_2$, referred to herein as the hashed randomized sub-selection criterion (HRSSC), using a cryptographically secure hashing algorithm. Next, the processor 52 calculates, for each cryptographic identity $y_i=g^{x_i}$ (i.e., each public key) in the list of allowed participant identities 212, a hash of an address of the respect cryptographic identity $y_i$ concatenated with the latest verifiable random value $\xi_2$ (i.e., the RSSC), referred to herein as the account hashed randomized sub-selection criterion (AHRSSC), using the cryptographically secure hashing algorithm. The processor 52 XOR's the bits of each AHRSSC value with the bits of the HRSSC and stores the XOR results in an array that is indexed with respect to the original cryptographic identities $y_i$ from the list of allowed participant identities 212. The processor 52 sorts the XOR results and selects a predefined number N of the original cryptographic identities $y_i$ from the list of allowed participant identities 212 that have smallest (or largest) value for the smallest XOR result. The selected N original cryptographic identities $y_i$ are stored in the list of authorized participants 214. It should be appreciated that this process results in a secure and random selection of a subset of N cryptographic identities $y_i$ from the list of allowed participant identities 212, in which the latest verifiable random value $\xi_2$ is used as the source of randomness. In other embodiments, other techniques can be used to securely and randomly select the subset of N cryptographic identities $y_i$ from the list of allowed participant identities 212 using the latest verifiable random value $\xi_2$ as source of randomness.

The processor 52 operates the communication module 56 to store the list of authorized participant identities 214 on the blockchain $BC_1$. In some embodiments, the processor 52 operates the communication module 56 to broadcast the list of authorized participant identities 214 to the distributed network 20 and/or the plurality of data storing devices 60, or to send notification messages to the particular data storing devices 60 corresponding to the N cryptographic identities $y_i$ in the list of authorized participants 214.

Figure 5:
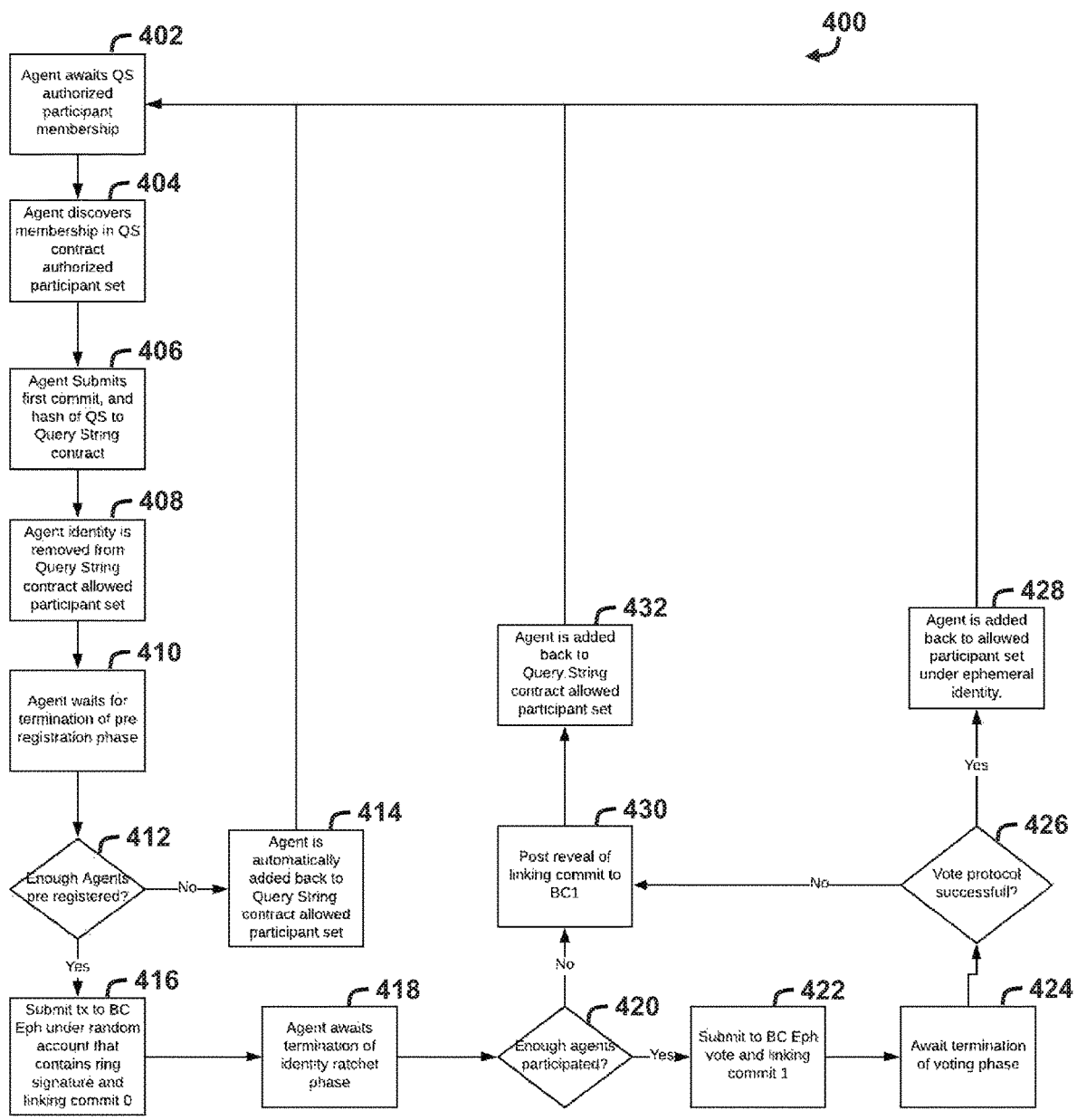
FIG. 5 shows a method for participating in a collection of statistics with respect to an aggregation of distributed private data.

The method 300 continues with a step of waiting to receive pre-registration messages from data storing devices corresponding to identities in the authorized participant subset of the data storing devices (block 318). Particularly, FIG. 5 shows a method 400 for participating in the collection of statistics with respect to an aggregation of distributed private data. The method enables an individual data storing device to participate in a querying process for a particular query in such a manner that the answer provided by the individual data storing device cannot be tied to the individual data storing device, thus maintaining the privacy of the private data stored by each data storing device.

The method 400 begins with steps of waiting (block 402) until the agent software of a data storing device discovers that is a member of an authorized participant subset for a particular query string (block 404). Particularly, the processor 62 of a data storing device 60, which is registered with the list of agent software entities 204 that are allowed to perform service transactions on the blockchain $BC_1$, discovers that it the data storing device 60 is a member of the list of authorized participant identities 214 for a particular query string. In some embodiments, the processor 62 periodically checks the blockchain $BC_1$ to determine whether its corresponding cryptographic identity $y_i$ is in the list of authorized participant identities 214 for a particular query string. In some embodiments, the processor 62 receives a notification message indicating that its corresponding cryptographic identity $y_i$ is in the list of authorized participant identities 214 for a particular query string.

After discovering membership in an authorized participant subset for a particular query string, the method 400 continues with a step of submitting a first commit and a query string hash to the query string smart contract (block 406). Particularly, the processor 62 of the data storing device 60 generates a first commit and a query string hash, which are to be included in a pre-registration message. The processor 62 generates the first commit as a hash $H(y_i\|r_1)$ of its respective cryptographic identity $y_i=g^{x_i}$ concatenated with a random value $r_1$ using a hashing algorithm. The processor 62 reads the query string QS from the blockchain $BC_1$ and calculates the query string hash $H(QS)$ based on the query string QS using the hashing algorithm. The processor 62 operates the communication module 66 to transmit a pre-registration message, which includes the first commit $H(y_i\|r_1)$ and the query string hash $H(QS)$ to the query string smart contract 208 on the blockchain $BC_1$. In at least one embodiment, the pre-registration message includes a message signature under the cryptographic identity $y_i$ of the data storing device 60, generated by the processor 62 with the corresponding private key $x_i$. The signature may be in the form of an Elliptic Curve Digital Signature Algorithm (ECDSA) signature in a public key recoverable format.

The method 400 continues with a steps of executing the query string smart contract to remove the pre-registered data storing device from the allowed participant set (block 408) and then waiting, with the data storing device, for termination of the pre-registration phase (block 410). Particularly, in response to receiving the pre-registration message from the data storing device 60, the processor 52 executes instructions of query string smart contract 208 to remove the respective cryptographic identity $y_i$ of the data storing device 60 from the list of allowed participant identities 212 and/or the list of agent software entities 204. In at least one embodiment, the processor 52 operates the communication module 56 to transact with the identity registry smart contract 202 to remove the respective cryptographic identity $y_i$ of the data storing device 60 from the list of agent software entities 204. In this way, once the data storing device 60 has pre-registered to participate in the querying process for a particular query string, the data storing device 60 is prevented from simultaneously participating in other querying processes for other query strings. Additionally, as will be described below, the cryptographic identity $y_i$ of the data storing device 60 is not added back to the list of allowed participant identities 212 or list of agent software entities 204 unless the data storing device 60 participates properly in the querying process.

Returning to FIG. 4, the method 300 continues with a step of executing the query string smart contract to check whether greater than a predetermined threshold number of data storing devices pre-registered (block 320). Particularly, the processor 52 of one or more of the watchtowers 50 executes instructions of the query string smart contract 208 to check if a threshold number $Th_p$ pre-registration messages have been received from data storing devices 60 corresponding to the N cryptographic identities $y_i$ in the list of authorized participants 214. The threshold number $Th_p$ is a number less than N, which represents the safe lower bound for interaction such that the participating data storing devices 60 can vote without it being possible for their votes to be tied back to them in an individualized manner.

Regardless of whether the predetermined threshold number of data storing devices pre-registered, the method 300 continues with a step of incrementing a participation counter for all identities in the authorized participant subset that failed to pre-register (blocks 322 and 324). Particularly, the processor 52 of one or more of the watchtowers 50 executes instructions of the query string smart contract 208 to increment a non-participation counter for any data storing devices 60 that having cryptographic identities $y_i$ in the list of authorized participant identities 214 but who did not send pre-registration message with the first commit $H(y_i \| r_1)$. In some embodiments, the non-participation counter for each data storing device 60 is stored on the blockchain $BC_1$, for example in association with the list of agent software entities 204 that are allowed to perform service transactions on the blockchain $BC_1$ or with the list of allowed participant identities 212. It at least one embodiment, the cryptographic identity $y_i$ of a data storing device 60 is removed from the list of agent software entities 204 or from the list of allowed participant identities 212 in response to the respective non-participation counter reaching a predefined threshold, which is generally some large number suggestive of abandonment or retirement of the data storing device 60.

If less than the predetermined threshold number of data storing devices pre-registered, then the method 300 continues with a step of executing the query string smart contract to add the pre-registered data storing devices back to the allowed participant set (block 356). Likewise, with reference to FIG. 5, if less than the predetermined threshold number of data storing devices pre-registered, then the method 400 continues with a step of executing the query string smart contract to add the pre-registered data storing device back to the allowed participant set (block 414). Particularly, if the threshold number $Th_p$ of pre-registration messages are not received within a threshold time limit $Th_{t_r}$, then the query process fails. In response, the processor 52 of one or more of the watchtowers 50 executes instructions of the query string smart contract 208 to add the respective cryptographic identities $y_i$ of the data storing devices 60 that submitted a pre-registration message back to the list of allowed participant identities 212 and/or the list of agent software entities 204. In at least one embodiment, the processor 52 operates the communication module 56 to transact with the identity registry smart contract 202 to add back the respective cryptographic identities $y_i$ of the data storing devices 60 that submitted a pre-registration message to the list of agent software entities 204. In this way, the data storing devices 60 who pre-registered in good faith to participate in this querying process for this particular query string, even though the querying process failed, are now enabled again to participate in other querying processes for other query strings.

Returning to FIG. 4, if the predetermined threshold number of data storing devices pre-registered, then the method 300 continues with a step of executing the query string smart contract to construct a genesis block for an ephemeral blockchain $BC_{eph}$ for the particular query (block 326). Otherwise the method 300 continues to block 356, discussed below. Particularly, if the threshold number $Th_p$ of pre-registration messages are received within a threshold time limit $Th_{t_r}$, then the query process proceeds. In response, the processor 52 of one or more of the watchtowers 50 executes instructions of the query string smart contract 208 to construct a genesis block for an ephemeral blockchain $BC_{eph}$, which will be used for the querying process for the particular query string QS.

With reference to FIG. 3, the genesis block of the ephemeral blockchain $BC_{eph}$ includes a list of pre-registered identities 216 and a voting smart contract 218. The list of pre-registered identities 216 consists of subset of public keys $y_i = g^{x_i}$ for the data storing devices 60 that pre-registered by sending the pre-registration message and defines the limited set of identities that can transact with the voting smart contract 218. The voting smart contract 218 is configured to enable secure and anonymous voting during the querying process for the particular query string QS. In one embodiment, the genesis block of the ephemeral blockchain $BC_{eph}$ is generated such that any of the participants of the distributed network 20 may read it. In some embodiments, list of pre-registered identities 216 and other state information may be hard-coded into the genesis block of the ephemeral blockchain $BC_{eph}$, as a means to enforce access control and proper observance of rules for the execution flow. In some embodiments, accounts of the ephemeral blockchain $BC_{eph}$ carry no tokens or balance of any kind. In some embodiments, the ephemeral blockchain $BC_{eph}$ is configured to prevent creation of any smart contracts outside of the genesis block. In other words, the voting smart contract 218 is the only smart contract on the ephemeral blockchain $BC_{eph}$.

In some embodiments, the processor 52 generates the genesis block of the ephemeral blockchain $BC_{eph}$ using a genesis block template in which appropriate state information is inserted to ensure proper function of the system. In some embodiments, the genesis block of the ephemeral blockchain $BC_{eph}$ is constructed from public information, which is for example stored on the blockchain $BC_1$. Alternatively, some external entity may post some necessary information, such as the genesis block template, for construction of the genesis block of the ephemeral blockchain $BC_{eph}$.

It will be appreciated that using the ephemeral blockchain $BC_{eph}$, which is separate from the blockchain $BC_1$, has several advantages. First, the ephemeral blockchain $BC_{eph}$ will be of very small size in total data stored, which allows resource constrained devices to fully sync the blockchain state without having significant impact on battery or bandwidth consumption. Second, the use of the ephemeral blockchain $BC_{eph}$ allows the blockchain $BC_1$ to remain smaller. Third, the transcript of the voting record is stored outside of the blockchain $BC_1$ and, thus, the future increase in computational power for maintaining the blockchain $BC_1$ is minimized. Although the voting transcripts will be capable of being replayed by the participating data storing devices 60 at a minimum, the blockchain $BC_1$ does not store a permanent transcript of all cryptographic operations.

In some embodiments, the ephemeral blockchain $BC_{eph}$ is a permissioned blockchain that utilizes the leader election process with respect to an allowed set of validators, as described above with respect to the blockchain $BC_1$. The allowed set of validators for the purpose of block generation in the ephemeral blockchain $BC_{eph}$ includes the watchtower 50 that funded registration of the pre-registered data storing devices 60 and a random subset of the other watchtowers 50 that operate and maintain the blockchain $BC_1$. In one embodiment, the mechanism for selecting random subset of the other watchtowers 50 utilize the pseudo-random sequence verifiable random values $\xi$ provided by the decentralized random beacon 40 in the same manner as described in the leader election process for the blockchain $BC_1$.

After constructing the genesis block for an ephemeral blockchain $BC_{eph}$, the method 300 continues with a step of waiting to receive identity ratchet messages having linking commits from data storing devices corresponding to identities in the pre-registered participant subset (block 328). Particularly, returning to FIG. 5, if the predetermined threshold number of data storing devices pre-registered, then the method 400 continues with a step of submitting an identity ratchet message having a linking commit to the voting smart contract (block 416) and then waiting for termination of the identity ratchet phase (block 418). Particularly, the processor 62 of the data storing device 60 generates a linking commit, which is to be included in an identity ratchet message. The processor 62 generates the linking commit as a hash $H(y_i\|r_2)$ of its respective cryptographic identity $y_i=g^{x_i}$ concatenated with a random value $r_2$ using a hashing algorithm, as similarly discussed with respect to the first commit included in the pre-registration message.

The voting smart contract 218 is configured to only allow transactions if they include a valid linkable ring signature that proves membership of the list of pre-registered identities 216. It will be appreciated that a ring signature, also referred to as a spontaneous anonymous group signature, enables any member of a group to generate a signature such that any public verifier can determine if the signature is generated by a group member. Additionally, a ring signature is anonymous, meaning that the particular signing member cannot be identified based on the signature. A linkable ring signature has the further quality that two or more signatures by the same signing member can be identified as being by the same signing member, while the signing member nevertheless remains anonymous. In this way, the linkable ring signature enables the data storing device 60 to anonymously prove membership of the list of pre-registered identities 216.

To this end, the processor 62 generates a linkable ring signature, which is also to be included in the identity ratchet message. In order to generate a valid linkable ring signature, the processor 62 requires a set of n public keys $L=\{y_1, \ldots, y_n\}$ and a private key $x_\pi$ corresponding to a public key $y_\pi$, such that $y_\pi=g^{x_\pi}$, which is in the set of public keys $L=\{y_1, \ldots, y_n\}$, where $1 \leq \pi \leq n$. The set of n public keys $L=\{y_1, \ldots, y_n\}$ defines the group of identities, referred to as the query string ring, which can sign a valid linkable ring signature. The set of n public keys $L=\{y_1, \ldots, y_n\}$ includes the subset of n−1 cryptographic identities $y_i$ included in the list of pre-registered identities 216 and a query string ring key. The processor 62 calculates the query string ring key by mapping the query string hash H(QS) to a point on an elliptic curve, using a hash to curve function. The resulting point on the elliptic curve is utilized as query string ring key. It will be appreciated that, in this context, the query string ring key is a public key for which a corresponding private key is unknown to any member of the query string ring and, thus, no member of the query string ring can generate a linkable ring signature under the query string ring key. Instead, the query string ring key functions to uniquely tie the set of n public keys $L=\{y_1, \ldots, y_n\}$ to the particular query string QS. To obtain the remainder of the set of n public keys $L=\{y_1, \ldots, y_n\}$, the processor 62 reads the cryptographic identities $y_i$ from the list of pre-registered identities 216, stored on the ephemeral blockchain $BC_{eph}$, which includes the public key $y_\pi$ to which the data storing device 60 has the corresponding private key $x_\pi$.

The processor 62 generates the linkable ring signature, using the set of n public keys $L=\{y_1, \ldots, y_n\}$ and it's private key $x_\pi$, according to the following procedure. First, for the purposes of linkable ring signatures, let $G=\langle g \rangle$ be finite cyclic group of prime order q such that the underlying discrete logarithm problem (e.g., Diffie-Hellman) is intractable, where g is a generator in G. Additionally, let $H_1$: $\{0,1\}^* \to \mathbb{Z}_q$ and $H_2$: $\{0,1\}^* \to G$ be some statistically independent cryptographic hash functions. Given a message $m \in \{0,1\}^*$, the processor 62 calculates a linkable ring signature $\sigma_L(m)$ by first calculating $h=H_2(L)$ and then $\tilde{y}h^{x_\pi}$. Next, the processor 62 picks a value $u \in_R \mathbb{Z}_q$ and calculates $c_{\pi+1}=H_1(L,\tilde{y},m,g^u,h^u)$. Next, for $i=\pi+1, \ldots, n, 1 \ldots, \pi-1$, the processor 62 picks a value $s_i \in_R \mathbb{Z}_q$, and calculates $c_{i+1}=H_1(L,\tilde{y},m,g^{s_i}y_i^{c_i},h^{s_i}\tilde{y}^{c_i})$. Next the processor 62 calculates $s_\pi=u-x_\pi c_\pi$ mod q 4. Finally, the processor 62 forms linkable ring signature $\sigma_L(m)$ as $\sigma_L(m)=(c_1,s_1,\ldots,s_n,\tilde{y})$. In one embodiment, the message m, which is used for the linkable ring signature $\sigma_L(m)$ is the linking commit $H(y_i\|r_2)$, but the linkable ring signature $\sigma_L(m)$ can also be generated using another arbitrary message m.

Finally, the processor 62 operates the communication module 66 to transmit an identity ratchet message, which includes the linking commit $H(y_i\|r_2)$ and the linkable ring signature $\sigma_L(m)$ to the voting smart contract 218 on the ephemeral blockchain $BC_{Eph}$. The identity ratchet message includes a message signature under an ephemeral identity $y_{Eph_i}$, which is generated by the processor 62 with a randomly selected ephemeral private key $x_{Eph_i}$. The message signature is in the form of an Elliptic Curve Digital Signature Algorithm (ECDSA) signature in a public key recoverable format, such that the ephemeral identity $y_{Eph_i}$ (i.e., a public key) can be extracted from the message signature.

In response to receiving each identity ratchet message, the processor 52 of one or more of the watchtowers 50 executes instructions of the voting smart contract 218 to verify that the linkable ring signature $\sigma_L(m)$ is valid and, thus, that the data storing device 60 from which the respective identity ratchet message was received is a member of the query string ring and, thus, the list of pre-registered identities 216. The processor 52 verifies the each linkable ring signature $\sigma_L(m)$ according to the following procedure. Given $\sigma_L(m)=(c_1, s_1, \ldots, s_n, \tilde{y})$, the processor 52 first calculates $h=H_2(L)$. Next, for $i=1, \ldots, n$, the processor 52 calculates $z_i'=g^{s_i}y_i^{c_i}$ and $z_i''=h^{s_i}\tilde{y}^{c_i}$. Next, the processor 52 calculates $c_{i+1}=H_1(L,\tilde{y},m,z_i',z_i'')$, if $i \neq n$. Finally, the processor 52 checks whether $c_1=H_1(L,\tilde{y},m,z_n',z_n'')$. If yes, the linkable ring signature $\sigma_L(m)$ is valid. Otherwise, the linkable ring signature $\sigma_L(m)$ is invalid and the identity ratchet message is rejected and ignored.

Additionally, in response to receiving each identity ratchet message, the processor 52 of one or more of the watchtowers 50 executes instructions of the voting smart contract 218 to check if the linkable ring signature $\sigma_L(m)$ collides with any linkable ring signature $\sigma_L(m)$ received with previous identity ratchet messages (i.e., was generated with the same private key $x_\pi$ as another linkable ring signature). Particularly, the processor 52 checks if a first linkable ring signature $\sigma_L'(m')=(c_1', s_1', \ldots, s_n', \tilde{y}')$ was signed with the same private key as a second linkable ring signature of $\sigma_L''(m'')=(c_1'', s_1'', \ldots, s_n'', \tilde{y}'')$, where m' and m'' are some messages, by checking if $\tilde{y}'=\tilde{y}''$. If yes, the linkable ring signatures $\sigma_L'(m')$ and $\sigma_L''(m'')$ are colliding, indicating that a data storing device 60 may be improperly attempting to claim more than one ephemeral identity $y_{Eph_i}$, and one or both of the identity ratchet message are rejected and ignored.

Returning to FIG. 4, after receiving identity ratchet messages data storing devices corresponding to identities in the pre-registered participant subset, the method 300 continues with a step of executing the voting smart contract to store an allowed signer subset to the ephemeral blockchain $BC_{eph}$ (block 330). Particularly, the processor 52 of one or more of the watchtowers 50 executes instructions of the voting smart contract 218 to operate the communication module 56 to store a list of allowed signers 220 on the ephemeral blockchain $BC_{eph}$. The list of allowed signers 220 comprises an unsorted linked list of ephemeral identities $y_{Eph_i}$ (i.e., a set of public keys $y_{Eph_i}=g^{Eph_i}$) associated with data storing devices 60 that participated in the identity ratchet phase by sending an identity ratchet message having a valid and non-colliding linkable ring signature. The list of allowed signers 220 further includes the cryptographic identity $y_{DG}$ of the data gathering device 70.

It should be appreciated that each of the data storing devices 60 that participated in the identity ratchet phase now has an ephemeral identity $y_{Eph_i}$, stored in the list of allowed signers 220 on the ephemeral blockchain $BC_{eph}$, which is not directly linkable with its original cryptographic identities $y_i$, stored in the list of pre-registered identities 216 on the ephemeral blockchain $BC_{eph}$. This enables the data storing devices 60 to vote anonymously in the voting phase, which is to follow.

The method 300 continues with a step of step of executing the voting smart contract to store the linking commits received from the data storing devices on the blockchain $BC_1$ (block 332). Particularly, the processor 52 of one or more of the watchtowers 50 executes instructions of the voting smart contract 218 to operate the communication module 56 to store a list of linking commits 222 on the blockchain $BC_1$. The list of linking commits 222 includes linking commits $H(y_i\|r_2)$ that are received with the identity ratchet messages from the data storing devices 60 that also included a valid and non-colliding linkable ring signature $\sigma_L(m)$. In one embodiment, storing the linking commits $H(y_i\|r_2)$ in the list of linking commits 222 on the blockchain $BC_1$ requires transacting with the query string smart contract 208 to add the linking commits $H(y_i\|r_2)$ to the list of linking commits 222.

In one embodiment, the processor 52 of one or more of the watchtowers 50 executes instructions of the voting smart contract 218 to co-sign the linking commits $H(y_i\|r_2)$ that are added to the list of linking commits 222, indicating that they were in fact submitted alongside a valid and non-colliding linkable ring signature. Alternatively, another mechanism is used to prove each linking commit is valid through a merkle proof of inclusion in the ephemeral blockchain $BC_{eph}$ that proves each block was signed by the validators of the ephemeral blockchain $BC_{eph}$.

The method 300 continues with a step of executing the voting smart contract to check whether greater than a predetermined threshold number of data storing devices submitted identity ratchet messages (block 334). Particularly, the processor 52 of one or more of the watchtowers 50 executes instructions of the voting smart contract 218 to check if a threshold number $Th_p$ identity ratchet messages have been received from data storing devices 60 with valid and non-colliding linkable ring signatures and under new anonymized ephemeral identities $y_{Eph_i}$. As mentioned above, the threshold number $Th_p$ represents the safe lower bound for interaction such that the participating data storing devices 60 can vote without it being possible for their votes to be tied back to them in an individualized manner.

If the predetermined threshold number of data storing devices submitted identity ratchet messages, then the method 300 continues with a step of executing the voting smart contract to remove the linking commits stored on the blockchain $BC_1$ (block 336). Otherwise the method 300 continues to blocks 352, 354, and 356, discussed below. Particularly, if the threshold number $Th_p$ of identity ratchet messages are received within a threshold time limit $Th_t$, then the query process proceeds. In response, the processor 52 of one or more of the watchtowers 50 executes instructions of the voting smart contract 218 to remove the linking commits $H(y_i\|r_2)$ that where included with the identity ratchet messages from the list of linking commits 222. In one embodiment, removing the linking commits $H(y_i\|r_2)$ from list of linking commits 222 on the blockchain $BC_1$ requires transacting with the query string smart contract 208 to remove the linking commits $H(y_i\|r_2)$ from the list of linking commits 222.

If at the end of the threshold time limit $Th_t$, at least the threshold number $Th_p$ identity ratchet messages having valid and non-colliding linkable ring signatures have been received, the ephemeral blockchain $BC_{eph}$ and/or the voting smart contract 218 transitions from an open participation model to closed participation model in which only the ephemeral identities $y_{Eph_i}$ and the cryptographic identity $y_{DG}$ stored in the list of allowed signers 220.

After removing the linking commits stored on the blockchain $BC_1$, the method 300 continues with a step of waiting to receive vote messages having a vote and a further linking commit (block 338). Particularly, returning to FIG. 5, if the predetermined threshold number of data storing devices participated in the identity ratchet phase (block 420), then the method 400 continues with a step of submitting a vote message having a further linking commit and a homomorphic vote share to the voting smart contract (block 422) and then waiting for termination of the voting phase (block 424). Particularly, the processor 62 of the data storing device 60 generates a further linking commit, which is to be included in a vote message. The processor 62 generates the further linking commit as a hash $H(y_i\|r_3)$ of its respective cryptographic identity $y_i = g^{x_i}$ concatenated with a random value $r_3$ (which is different from the random value $r_2$ used for the previous linking commit) using a hashing algorithm, as similarly discussed with respect to the first commit included in the pre-registration message and the previous linking commit included in the identity ratchet message.

The processor 62 of each data storing device 60 generates a query result based on the private data 67 stored at the respective data storing device 60. First, the processor 62 determines a true query result by evaluating or executing the query string QS against the private data 67 stored at the respective data storing device 60 and stores this true query result in the memory 64. Next, the processor 62 randomly determines a random value in the domain of $\{0,1\}$. If the determined random value is $\{1\}$, then the data storing device 60 will vote honestly using the true query result. Otherwise, the randomly determined value is $\{0\}$, then the data storing device 60 will vote randomly by randomly determining a random query result in the domain of $\{0,1\}$ and voting using the random query result in place of the true query result. It will be appreciated that this process of randomly voting with the true query result or the random query result, provides locally differential privacy. In an alternative embodiment, in the event that the query string QS has an expected output of confidence levels, a multi ballot voting protocol be used instead where each candidate on the ballot represents a single vote for a confidence threshold. In this construct, the vote is based on true query result.

Next, based on the vote (which may be the true query result or the random query result), the processor 62 of each data storing device 60 generates a homomorphic vote share $hvs_i$. The processor 62 generates the homomorphic vote share $hvs_i$ according to the following homomorphic encryption scheme. First, for the purposes of the homomorphic encryption scheme, let $G = \langle g \rangle$ be finite cyclic group of prime order q such that the underlying discrete logarithm problem (e.g., Diffie-Hellman) is intractable, where g is a generator in G. Additionally, let there be n participants $P_i$, which includes the participating data storing devices 60 and the data gathering device 70 corresponding to the cryptographic identities stored in the list of allowed signers 220. Each participant $P_i$ has an private key $x_i$, which is the ephemeral private key $x_{Eph_i}$ for the data storing devices 60 and the private key $x_{DG}$ for the data gathering device 70. Each participant $P_i$ has a public key $x=g^{x_i}$, which is the ephemeral public key $y_{Eph_i}$ for the data storing devices 60 and the public key $y_{DG}$ for the data gathering device 70. Finally, let each participate have a vote $v_i$, which corresponds to the true query result or the random query result, as discussed above.

To determine the homomorphic vote share $hvs_i$, the processor 62 computes a homomorphic tallying public key h as:

$$h = g^{y_i} = \prod_{j=1}^{i-1} g^{x_j} / \prod_{j=i+1}^{i-1} g^{x_j}$$

If the data storing device 60 will vote $v_i=\{1\}$, then the processor 62 calculates an encrypted vote $y=h^{x_i}g^{v_i}=h^{x_i}g$ under El Gamal encryption. The processor 62 picks a random value $w \in_R \mathbb{Z}_q$, a random value $r_1 \in_R \mathbb{Z}_q$, and a random value $d_1 \in_R \mathbb{Z}_q$. Next, the processor 62 calculates $a_1=g^{r_1}x^{d_1}$, $b_1=h^{r_1}y^{d_1}$, $a_2=g^w$, and $b_2=h^w$. Next, the processor 62 calculates a Fiat-Shamir value $c=H(x,y,a_1,b_1,a_2,b_2)$ using a hashing algorithm. Next, the processor 62 calculates $d_2=c-d_1$ and then $r_2=w-x_id_2$.

If instead the data storing device 60 will vote $v_i=\{0\}$, then the processor 62 calculates an encrypted vote $y=h^{x_i}g^{v_i}=h^{x_i}$, under El Gamal encryption. The processor 62 picks a random value $w \in_R \mathbb{Z}_q$, a random value $r_2 \in_R \mathbb{Z}_q$, and a random value $d_2 \in_R \mathbb{Z}_q$. Next, the processor 62 calculates $a_1=g^w$, $b_1=h^w$, $a_2=g^{r_2}x^{d_2}$, and $b_2=h^{r_2}(y-g)^{d_2}$. Next, the processor 62 calculates a Fiat-Shamir value $c=H(x,y,a_1,b_1,a_2,b_2)$ using a hashing algorithm. Next, the processor 62 calculates $d_1=c-d_2$ and then $r_1=w-x_id_1$.

Finally, in either case, the processor 62 calculates the homomorphic vote share $hvs_i$ as $hvs_i=(c,g^{x_i},y,a_1,b_1,a_2,b_2,d_1,d_2,r_1,r_2)$. It will be appreciated that the homomorphic vote share $hvs_i$ comprises the public key $g^{x_i}=x=y_{Eph_i}$ for the particular data storing device 60 and the encrypted vote $y=h^{x_i}g^{v_i}=g^{x_iy_i}g^{v_i}$ for the particular data storing device 60. The remaining terms of the homomorphic vote share $hvs_i$ are used as non-interactive zero knowledge proofs.

The processor 62 then operates the communication module 66 to transmit a vote message, which includes the further linking commit $H(y_i||r_3)$ and the homomorphic vote share $hvs_i$ to the voting smart contract 218 on the ephemeral blockchain $BC_{Eph}$. The vote message includes a message signature under the ephemeral identity $y_{Eph_i}$. The message signature is in the form of an Elliptic Curve Digital Signature Algorithm (ECDSA) signature in a public key recoverable format, such that the ephemeral identity $y_{Eph_i}$ (i.e., a public key) can be extracted from the message signature.

In response to receiving each vote message, the processor 52 of one or more of the watchtowers 50 executes instructions of the voting smart contract 218 to verify that the respective homomorphic vote share $hvs_i$ was prepared correctly. Particularly, the processor 52 verifies that $c=d_1+d_2$, $a_1=g^{r_1}x^{d_1}$, $a_2=h^{r_1}y^{d_1}$, $a_1=g^{r_2}x^{d_2}$, and $b_2=h^{r_2}(y-g)^{d_2}$. If so, the homomorphic vote share $hvs_i$ is valid. Otherwise, the homomorphic vote share $hvs_i$ is invalid and the vote message is rejected and ignored. If the homomorphic vote share $hvs_i$ is determined to be valid, the processor 52 operates the communication module 56 to store the homomorphic vote share $hvs_i$ in vote data 224 on the ephemeral blockchain $BC_{eph}$.

Returning to FIG. 4, the method 300 continues with of step of executing the voting smart contract to store the further linking commits received from the data storing devices on the blockchain $BC_1$ (block 340). Particularly, the processor 52 of one or more of the watchtowers 50 executes instructions of the voting smart contract 218 to operate the communication module 56 to store the further linking commits $H(y_i||r_3)$ that are received with the vote messages from the data storing devices 60 in the list of linking commits 222 on the blockchain $BC_1$. In one embodiment, storing the further linking commits $H(y_i||r_3)$ in the list of linking commits 222 on the blockchain $BC_1$ requires transacting with the query string smart contract 208 to add the further linking commits $H(y_i||r_3)$ to the list of linking commits 222.

In one embodiment, the processor 52 of one or more of the watchtowers 50 executes instructions of the voting smart contract 218 to co-sign the further linking commits $H(y_i||r_3)$ that are added to the list of linking commits 222, indicating that they were in fact submitted member of the list of allowed signers 220. Alternatively, another mechanism is used to prove each linking commit is valid through a merkle proof of inclusion in the ephemeral blockchain $BC_{eph}$ that proves each block was signed by the validators of the ephemeral blockchain $BC_{eph}$.

The method 300 continues with a step of executing the voting smart contract to check whether all votes have been received from the participating data storing devices (block 342). Particularly, the processor 52 of one or more of the watchtowers 50 executes instructions of the voting smart contract 218 to check whether votes messages having valid homomorphic vote shares $hvs_i$ have been received from data storing devices 60 corresponding to all of the anonymized ephemeral identities $y_{Eph_i}$ in the list of allowed signers 220. It will be appreciated that, a vote tally cannot be calculated under a homomorphic tallying process unless homomorphic vote shares $hvs_i$ are submitted by identities in the list of allowed signers 220.

If all data storing devices in the list of allowed signers submitted vote messages, then the method 300 continues with a step of executing the voting smart contract to receive a final vote and final vote tally from the data gather device (block 344). Otherwise the method 300 continues to blocks 352, 354, and 356, discussed below. Particularly, if vote messages are received from all ephemeral identities $y_{Eph_i}$ in the list of allowed signers 220 within a threshold time limit $Th_{t_r}$, then the query process proceeds and the voting smart contract 218 waits to receive a final vote and final vote tally from the data gather device 70. It will be appreciated that, after vote messages having valid homomorphic vote shares $hvs_i$ are submitted by all data storing devices 60 in the list of allowed signers 220, the votes cannot be tallied because the final vote from the data gathering device 70 has not yet been cast. Particularly, in order to prevent any single voting party from observing the tally before the majority, the final vote is cast by the data gathering device 70 and the data gathering device 70 calculates the final vote tally. The data gathering device 70 submits the final vote and the final vote tally simultaneously.

First, the processor 72 of the data gathering device 70 selects a final vote $v_i$. The processor 72 may select final vote $v_i$ randomly, or always select a certain vote (e.g., $v_i=\{0\}$). The processor 72 calculates an encrypted vote $y=h^{x_i}g^{v_i}=g^{x_iy_i}y^{v_i}$ using the same process described above with respect to the participating data storing devices 60. Next, the processor 72 generates a respective homomorphic vote share $hvs_i$ using the same process described above with respect to the participating data storing devices 60.

Next, the processor 72 calculates the final vote tally $c_i$ according to the equation:

$$\Pi y = \Pi g^{x_i v_i} g^{v_i} = g^{\Sigma_i v_i} = g^{c_i}$$

where $y = g^{x_i v_i} g^{v_i}$ are the encrypted votes from the participating data storing devices 60 and from the data gathering device 70. The term $\Sigma_i v_i$ is equal to the final vote tally of votes $v_i = \{1\}$ and is denoted $c_i$, where $0 \leq c_i \leq n$ and n is the number of participants $P_i$. The processor 72 calculates the discrete logarithm of $g^{c_i}$ to arrive at the final vote tally $c_i$, for example, using exhaustive search or Shanks' baby-step giant-step algorithm.

Finally, the processor 72 operates the communication module 76 to transmit a final vote message to the voting smart contract 218 on the ephemeral blockchain $BC_{Eph}$. The final vote message includes the final vote tally $c_i$ and the final homomorphic vote share $hvs_i$ having the final encrypted vote y of the data gathering device 70. In one embodiment, the final vote message further includes the final vote $v_i$ of the data gathering device 70 so that a corrected tally can be found that excludes the vote of the data gathering device 70. The final vote message includes a message signature under the cryptographic identity $y_{DG}$ of the data gathering device. In one embodiment, the message signature is in the form of an Elliptic Curve Digital Signature Algorithm (ECDSA) signature in a public key recoverable format.

In response to the final vote message, the processor 52 of one or more of the watchtowers 50 executes instructions of the voting smart contract 218 to verify that the final vote tally $c_i$ and final homomorphic vote share $hvs_i$ were correctly determined. Particularly, the processor 52 verifies the final homomorphic vote share $hvs_i$ in the same manner described above with respect to the homomorphic vote shares $hvs_i$ received from the data storing devices 60. If the homomorphic vote share $hvs_i$ is determined to be valid, the processor 52 operates the communication module 56 to store the homomorphic vote share $hvs_i$ in the vote data 224 on the ephemeral blockchain $BC_{eph}$.

In response to the final vote message, the processor 52 also verifies the final vote tally $c_i$ in the same manner described above with respect to the data gathering device 70. If final vote tally $c_i$ is determined to be correct, the processor 52 operates the communication module 56 to store the final vote tally $c_i$ in the vote data 224 on the ephemeral blockchain $BC_{eph}$.

The method 300 continues with a step of terminating the ephemeral blockchain $BC_{Eph}$ (block 346) and posting the final vote tally and a final block hash the ephemeral blockchain $BC_{Eph}$ to the blockchain $BC_1$ (block 348). Particularly, the processor 72 of the data gathering device 70 terminates the ephemeral blockchain $BC_{Eph}$. The processor 72 operates the communication module 76 to store, on the blockchain $BC_1$, results data 226 including a hash $H(BC_{Eph_{Gen}})$ of the genesis block of ephemeral blockchain $BC_{Eph}$, a hash $H(BC_{Eph_{Fin}})$ of the final block of ephemeral blockchain $BC_{Eph}$, and the final vote tally $c_i$. In one embodiment, storing the results data 226 on the blockchain $BC_1$ requires transacting with the query string smart contract 208 to store the results data 226. In this way, state changes of any ephemeral blockchain $BC_{Eph}$ are linked to the permanent record of the blockchain $BC_1$. Given this information, and the information provided in the state of the blockchain $BC_1$, an auditable proof of correct transcript execution may be constructed.

After a successful querying process, the method 300 continues with a step of registering the ephemeral identities of the participating data storing devices as new identities on the blockchain $BC_1$ (block 350). Likewise, with reference to FIG. 5, if the querying process is successful (block 426), the method 400 continues with a step of registering the ephemeral identity of the data storing device as its new identities on the blockchain $BC_1$ (block 428). Particularly, the all ephemeral identities $y_{Eph_i}$ of a data storing device 60 that participated in the identity ratchet phase and the voting phase are added to the list of agent software entities 204 and/or the list of allowed participant identities 212 in place of the previous cryptographic identities $y_i$ of the respective data storing devices 60. In at least one embodiment, the processor 52 operates the communication module 56 to transact with the identity registry smart contract 202 to add the ephemeral identities $y_{Eph_i}$ of the data storing devices 60 to the list of agent software entities 204. In this way, after each successful querying process, all participating data storing devices 60 assume a new cryptographic identity. Accordingly, an adversary cannot correlate voting behavior across several query strings.

However, the querying process can fail at various stages, as discussed above. Particularly, the querying process can fail if the threshold number of data storing devices do not participate in the identity ratchet phase (block 334 of FIG. 4 and block 420 of FIG. 5) or all the data storing devices do not participate in the voting phase (block 343 of FIG. 4 and block 426 of FIG. 5). If one of these conditions occurs, the methods 300 and 400 proceed with steps of terminating the ephemeral terminating the ephemeral blockchain $BC_{Eph}$ (block 352) and transmitting a reveal message with each participating data storing device to the query string smart contract that proves proper participation (block 354 of FIG. 4 and block 430 of FIG. 5). Particularly, if the threshold number $Th_p$ of identity ratchet messages are not received within a threshold time limit $Th_{t_r}$, then the query process fails. Similarly, if vote messages are not received from all ephemeral identities $y_{Eph_i}$ in the list of allowed signers 220 within a threshold time limit $Th_{t_r}$, then the query process fails. In response, the processor 52 of one or more of the watchtowers 50 executes instructions of the query string smart contract 208 and/or the voting smart contract 218 to terminate the ephemeral blockchain $BC_{Eph}$. The processor 52 operates the communication module 56 to store, on the blockchain $BC_1$, results data 226 including a hash $H(BC_{Eph_{Gen}})$ of the genesis block of ephemeral blockchain $BC_{Eph}$ and a hash $H(BC_{Eph_{Fin}})$ of the final block of ephemeral blockchain $BC_{Eph}$. In this way, state changes of any ephemeral blockchain $BC_{Eph}$ are linked to the permanent record of the blockchain $BC_1$. Given this information, and the information provided in the state of the blockchain $BC_1$, an auditable proof of correct transcript execution may be constructed.

The processor 62 of each data storing device 60 generates a reveal signature $Sign(r_1, r_{2/3})$ as a signature of the random value $r_1$ used in the first commit $H(y_i \| r_1)$ and the random value $r_2$ or $r_3$ used in the most recent linking commit $H(y_i \| r_2)$ or $H(y_i \| r_3)$. The processor 62 operates the communication module 66 to transmit a reveal message which includes the reveal signature $Sign(r_1, r_{2/3})$ to the query string smart contract 208.

In response to receiving each reveal message, the processor 52 of one or more of the watchtowers 50 executes instructions of the query string smart contract 208 to verify that the respective data storing device 60 participated properly in the querying process. Particularly, the processor 52 calculates $pk = ECRecover(Sign(r_1, r_{2/3}))$, where $ECRecover( )$ is a public key recovery algorithm for an elliptic curve digital signature used to generate the reveal signature $Sign(r_1, r_{2/3})$. The processor 52 checks whether $H(pk\|r_1)=H(y_i\|r_1)$ and checks whether $H(pk\|r_2)=H(y_i\|r_2)$ or $(pk\|r_3)=H(y_i\|r_3)$, depending on which linking commit $H(y_i\|r_2)$ or $H(y_i\|r_3)$ is stored in the list of linking commits 222. If checks are true, then the reveal is valid and proves participation of the respective data storing device 60. It will be appreciated that an external observer will be unable to correlate any set of first commits or linking commits without the associated reveal signature. Additionally, an external observer will be unable to correlate any set of linking commits that are not revealed in combination. Thus, this protocol may be used to make multiple proofs against the first commit such that only those actions taken under an identity that posted a linking commit may be associated with the original identity when a reveal is provided.

The methods 300 and 400 continue with a step of executing the query string smart contract to add the proven participating data storing devices back to the allowed participant set (block 356 of FIG. 4 and block 432 of FIG. 5). Particularly, if a reveal signature $Sign(r_1, r_{2/3})$ received from a data storing device 60 is verified to prove that the data storing device 60 participated properly in the query process, the processor 52 of one or more of the watchtowers 50 executes instructions of the query string smart contract 208 to add the respective cryptographic identities $y_i$ of the data storing devices 60 that submitted the respective reveal message back to the list of allowed participant identities 212 and/or the list of agent software entities 204. In at least one embodiment, the processor 52 operates the communication module 56 to transact with the identity registry smart contract 202 to add back the respective cryptographic identities $y_i$ of the data storing devices 60 that submitted a reveal message to the list of agent software entities 204. In this way, the data storing devices 60 who participated in good faith to participate in this querying process for this particular query string, even though the querying process failed, are now enabled again to participate in other querying processes for other query strings.

It will be appreciated that any data storing device 60 that failed to participate in the identity ratchet phase or the voting phase will not have a linking commit stored on the blockchain $BC_1$. Accordingly, even if the data storing device 60 transmits a reveal message, the message cannot be verified. Thus, all participants who performed a pre-registration, but did not participate in the identity ratchet phase or the voting phase are removed from the system due to their non-reinstatement in the blockchain $BC_1$.

Finally, regardless of whether the querying process was successful or not, the method 300 proceeds with a step of executing the query string smart contract to removed data associated with the query string except the final vote tally and the final block hash (block 358). Particularly, the processor 52 of one or more of the watchtowers 50 executes instructions of the query string smart contract 208 to operate the communication module 56 to remove extraneous data relating to the querying process for the particular query string QS from the blockchain $BC_1$. The extraneous data that is removed may include the query string hash H(QS), the cryptographic identity $y_{DG}$ of the data gathering device 70, the verifiable random values $\xi_0, \xi_1,$ and $\xi_2$, the list of linking commits 222, and the list of authorized participant identities 214.

It will be appreciated that the methods 300 and 400 enable an interested party (e.g., the entity who owns or otherwise possesses a data gathering device 70) to query statistical information with respect to an aggregation of a plurality of private data sets held by an arbitrary number of data storing devices 60, each of which may be owned and controlled by different parties. Advantageously, the methods 300 and 400 also enable the statistical information to be queried without dispossessing any party of its privately held data and without requiring any trusted third parties to act as an intermediary.

As discussed above, in one particular example, the interested party associated with the data gathering device 70 may be an advertiser that wishes to purchase targeted advertisement impressions of a particular advertisement by consumers who fit within a target audience and are associated with the plurality of data storing devices 60. The methods 300 and 400 enable the advertiser to test the targeting model (i.e., a query string QS) with respect to the consumers associated with the plurality of data storing devices 60 to determine whether the targeting model defines a target audience having an appropriate scope (i.e., is not overly broad or overly narrow). It will be appreciated that having a targeting model with an appropriate scope is essential to a successful advertising campaign. Thus, based on the final vote tally $c_i$, which implicitly includes anonymized information about individual consumers, an advertiser can decide whether their targeting model is overly broad or overly narrow and update their targeting model (i.e., the query string QS) as needed. The methods 300 and 400 can then be used again to evaluate an updated query string QS defining an updated targeting model. When an appropriate targeting model has been decided upon, the advertiser may submit or upload one or more advertisements in conjunction with the targeting model and/or query string to an advertising network, demand-side platform, a publisher-side ad server, an advertiser-side ad server, or the like which enables the purchase of targeted advertisement impressions from publishers and other content providers that serve advertisements.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of participating with a first computing device in a calculation of a statistic with respect to distributed private data, the first computing device being one of a distributed plurality of computing devices each having a memory that stores private data that is a respective subset of the distributed private data, the method comprising:
reading, with a processor of the first computing device, a query string that is stored on a first blockchain, the query string having been submitted to the first blockchain by a second computing device;
determining, with the processor, a query result by evaluating the query string with respect to the private data stored on the memory of the first computing device;
determining, with the processor, a vote based on the query result;
determining, with the processor, an encrypted vote using a homomorphic encryption scheme; and
transmitting, with a transceiver of the first computing device, a first message to at least one second smart contract that is stored on a second blockchain, the first message including the encrypted vote.

2. The method of claim 1, wherein the query string defines a target audience for an advertisement and the query result indicates whether a user of the first computing device is within the target audience for the advertisement, the method further comprising:

updating the query string based, in part, on the encrypted vote; and uploading the query string and the advertisement to a server.

3. The method of claim 1, the determining the vote further comprising:

randomly selecting, with the processor, a first random value from a domain having only a first value and a second value;

determining, with the processor, the vote as being equal to the query result in response to the first random value being the first value; and determining, with the processor, the vote as being a random value in response to the first random value being the second value.

4. The method of claim 1, the determining the query result further comprising:

reading, with the processor, from the first blockchain, a list of public keys authorized to participate in a calculation of a statistic based on the query string with respect to the distributed private data; and determining, with the processor, the query result in response to a first public key associated with the first computing device being included in the list of public keys, the first public key being previously registered with and stored on the first blockchain.

5. The method of claim 1 further comprising:

calculating, with the processor, a first commit as a hash of a first public key concatenated with a first random value, the first public key being associated with the first computing device and being previously registered with and stored on the first blockchain; and transmitting, with the transceiver, prior to transmitting the first message, a second message to at least one first smart contract that is stored on the first blockchain, the second message including the first commit, the second message being signed under the first public key.

6. The method of claim 1 further comprising:

reading, with the processor, a plurality of public keys that are stored on the second blockchain, the plurality of public keys being associated with computing devices of the distributed plurality of computing devices and including a first public key associated with the first computing device;

calculating, with the processor, a hash of the query string;

determining, with the processor, a ring key by mapping the hash of the query string to a point on an elliptic curve using a hash to curve function;

determining, with the processor, a linkable ring signature based on the plurality of public keys and the ring key, using a first private key corresponding to the first public key; and transmitting, with the transceiver, prior to transmitting the first message, a third message to the at least one second smart contract that is stored on the second blockchain, the third message including the linkable ring signature, the second message being signed under a randomly selected public key.

7. The method of claim 6 further comprising:

calculating, with the processor, a second commit as a hash of the first public key concatenated with a second random value;

transmitting, with the processor, the third message to the at least one second smart contract that is stored on the second blockchain, the third message including the linkable ring signature and the second commit;

calculating, with the processor, a third commit as a hash of the first public key concatenated with a third random value; and transmitting, with the transceiver, the first message to the at least one second smart contract that is stored on the second blockchain, the first message including the encrypted vote and the third commit.

8. The method of claim 7 further comprising:

calculating, in response to a required number of other computing devices of the distributed plurality of computing devices failing to submit linkable ring signatures to the at least one second smart contract that is stored on the second blockchain, a signature of at least the second random value; and transmitting, with the transceiver, a fourth message including the signature of at least the second random value.

9. The method of claim 7 further comprising:

calculating, in response to a required number of other computing devices of the distributed plurality of computing devices failing to submit linkable ring signatures to the at least one second smart contract that is stored on the second blockchain, a signature of at least the third random value; and transmitting, with the transceiver, a fourth message including the signature of at least the third random value.

10. A method of calculating a statistic with respect to distributed private data, the distributed private data including a plurality of subsets of private data stored on respective memories of a distributed plurality of first computing devices, the method comprising:

generating, with a processor of a second computing device, a query string;

transmitting, with a transceiver of the second computing device, a first message to at least one first smart contract that is stored on a first blockchain, the first message including the query string;

reading, with the processor, a plurality of encrypted votes that are stored on a second blockchain, each of the plurality of encrypted votes having been determined by a respective first computing device of the distributed plurality of first computing devices based on the respective subset of private data stored on the respective memory thereof using a homomorphic encryption scheme;

determining, with the processor, a final encrypted vote using the homomorphic encryption scheme;

determining, with the processor, a final vote tally based on the plurality of encrypted votes and the final encrypted vote; and transmitting, with the transceiver, a second message to at least one second smart contract that is stored on the second blockchain, the second message including the final encrypted vote and the final vote tally.

11. The method of claim 10 further comprising:

calculating, with the processor, a hash of the query string; and transmitting, with the transceiver, prior to transmitting the first message, a third message to the at least one first smart contract that is stored on the first blockchain, the first message including the hash of the query string.

12. The method of claim 11 further comprising:

waiting to receive, with the transceiver, a predefined number of verifiable random values from a decentralized random beacon after transmitting the third message, the decentralized random beacon being configured to broadcast verifiable random values at regular intervals; and transmitting, with the transceiver, after receiving the predefined number of verifiable random values, the first message to the at least one first smart contract that is stored on the first blockchain, the first message including the query string and at least a most recent verifiable random value of the predefined number of verifiable random values.

13. The method of claim 10 further comprising:

storing, with the transceiver, on the first blockchain, the final vote tally and a hash of a final block of the second blockchain.

14. A method of operating at least one blockchain to enable a second computing device to calculate a statistic with respect to distributed private data, the distributed private data including a plurality of subsets of private data stored on respective memories of a distributed plurality of first computing devices, the method comprising:

executing, with at least one processor of at least one third computing device in a distributed network of third computing devices, instructions of at least one first smart contract stored on a first blockchain to (i) receive a query string from the second computing device and (ii) store the query string on the first blockchain;

executing, with the at least one processor, instructions of the at least one first smart contract stored on the first blockchain to generate a genesis block of a second blockchain, the genesis block storing at least one second smart contract;

executing, with the at least one processor, instructions of the at least one second smart contract stored on the second blockchain to (i) receive a plurality of encrypted votes from first computing devices of the distributed plurality of first computing devices and (ii) store the plurality of encrypted votes on the second blockchain, each of the plurality of encrypted votes having been determined by a respective first computing device of the distributed plurality of first computing devices based on the respective subset of private data stored on the respective memory thereof; and executing, with the at least one processor, instructions of the at least one second smart contract stored on the second blockchain to receive a final encrypted vote and a final vote tally from the second computing device, the final vote tally being determined by the second computing device based on the plurality of encrypted votes and the final encrypted vote.

15. The method of claim 14 further comprising:

executing, with the at least one processor, instructions of the at least one first smart contract stored on the first blockchain to (i) receive a first verifiable random value from a decentralized random beacon, the decentralized random beacon being configured to broadcast verifiable random values at regular intervals, (ii) determine, based on the first verifiable random value, a first list of public keys authorized to participate in a calculation of a statistic based on the query string with respect to the distributed private data, and (iii) store the first list of public keys on the first blockchain.

16. The method of claim 15 further comprising:

executing, with the at least one processor, instructions of the at least one first smart contract stored on the first blockchain to (i) receive first messages from first computing devices of the distributed plurality of first computing devices associated with public keys in first list of public keys and (ii) storing a second list of public keys on the second blockchain, the second list of public keys including public keys associated with the first computing devices from with the first messages were received.

17. The method of claim 16 further comprising:

executing, with the at least one processor, instructions of the at least one second smart contract stored on the second blockchain to (i) receiving second messages including linkable ring signatures from first computing devices of the distributed plurality of first computing devices, the second messages being signed anonymously by the first computing devices under randomly selected public keys and (ii) storing a third list of public keys on the second blockchain, the third list of public keys including the randomly selected public keys under which the second messages were signed.

18. The method of claim 17 further comprising:

executing, with the at least one processor, instructions of the at least one second smart contract stored on the second blockchain to verify that the linkable ring signatures were validly generated by first computing devices of the distributed plurality of first computing devices having associated public keys in the second list of public keys.

19. The method of claim 17 further comprising:

executing, with the at least one processor, instructions of the at least one first smart contract stored on the first blockchain to register and store the randomly selected public keys under which the second messages were signed on the first blockchain.

20. The method of claim 15 further comprising:

executing, with the at least one processor, instructions of the at least one second smart contract stored on the second blockchain to verify the final vote tally based on the plurality of encrypted votes and the final encrypted vote.

* * * * *